United States Patent
Al-Hajri

(10) Patent No.: US 11,939,861 B2
(45) Date of Patent: Mar. 26, 2024

(54) LEAD-FREE PINSCREEN IMPRINT DEVICE, SYSTEM, AND METHOD FOR RETRIEVING AT LEAST ONE IMPRINT OF A TOPMOST SURFACE OF A FISH LOCATED IN A WELLBORE

(71) Applicant: SAUDI ARABIAN OIL COMPANY, Dhahran (SA)

(72) Inventor: Saud Askar Al-Hajri, Abqaiq (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 49 days.

(21) Appl. No.: 17/462,489

(22) Filed: Aug. 31, 2021

(65) Prior Publication Data

US 2023/0068332 A1    Mar. 2, 2023

(51) Int. Cl.
*E21B 47/098*    (2012.01)
*G01B 11/24*    (2006.01)

(52) U.S. Cl.
CPC ............ *E21B 47/098* (2020.05); *G01B 11/24* (2013.01)

(58) Field of Classification Search
CPC ......... G01B 11/24; G01B 11/22; G01B 11/00; E21B 47/098; E21B 47/09; E21B 47/00
USPC ....................................................... 356/607
See application file for complete search history.

(56) References Cited

U.S. PATENT DOCUMENTS

| | | |
|---|---|---|
| 4,536,980 A | 8/1985 | Fleming |
| 4,654,989 A | 4/1987 | Fleming |
| 9,291,544 B1 * | 3/2016 | Boyer ................. G01M 5/0083 |
| 10,415,338 B2 | 9/2019 | Batarseh |
| 2002/0050930 A1 | 5/2002 | Thomeer et al. |
| 2004/0020087 A1 | 2/2004 | Fleming |
| 2009/0195647 A1 | 8/2009 | Lynde |
| 2014/0027118 A1 * | 1/2014 | DeLange ................. E21B 29/10 166/207 |

(Continued)

FOREIGN PATENT DOCUMENTS

| | | | | |
|---|---|---|---|---|
| CA | 2 434 770 A1 | 1/2005 | | |
| CN | 212743984 U * | 3/2021 | ........... | E21B 47/002 |

(Continued)

OTHER PUBLICATIONS

Machine generated translation of CN-212743984-U (Year: 2021).*

*Primary Examiner* — Michelle M Iacoletti
*Assistant Examiner* — Noah J. Haney
(74) *Attorney, Agent, or Firm* — Osha Bergman Watanabe & Burton LLP

(57) ABSTRACT

A lead-free pinscreen imprint device for retrieving at least one imprint of a topmost surface of a fish located in a wellbore may include a housing with a central aperture that extends along a section of a central axis thereof. The lead-free pinscreen imprint device may include a pinscreen portion disposed in the housing. The pinscreen portion may include various pins that are disposed along a vertical axis that is parallel to the central axis. The pinscreen portion may include an imprint surface that faces in a downward direction and a scanning surface that faces in an upward direction. The lead-free pinscreen imprint device may include a three-dimensional (3D) laser image scanner disposed in the housing at a location that is immediately above the pinscreen portion. The 3D laser image scanner may be configured to scan the scanning surface and identify any depth changes in the scanning surface.

20 Claims, 18 Drawing Sheets

(56) References Cited

U.S. PATENT DOCUMENTS

| | | |
|---|---|---|
| 2016/0084064 A1 | 3/2016 | Clemens |
| 2016/0102527 A1* | 4/2016 | Manson ................... E21B 31/00 |
| | | 166/243 |
| 2017/0044874 A1* | 2/2017 | Nicol ....................... E21B 31/12 |
| 2018/0003006 A1 | 1/2018 | Rud |
| 2020/0131854 A1 | 4/2020 | Batarseh |
| 2021/0046704 A1* | 2/2021 | Huttunen .............. B29C 64/393 |
| 2021/0404282 A1* | 12/2021 | McAllister .............. E21B 33/03 |

FOREIGN PATENT DOCUMENTS

| | | | | |
|---|---|---|---|---|
| CN | 212743984 U | 3/2021 | | |
| EP | 0 178 870 B1 | 9/1990 | | |
| GB | 2 231 357 A | 11/1990 | | |
| WO | WO-2015002641 A1 * | 1/2015 | ............. | E21B 31/12 |

\* cited by examiner

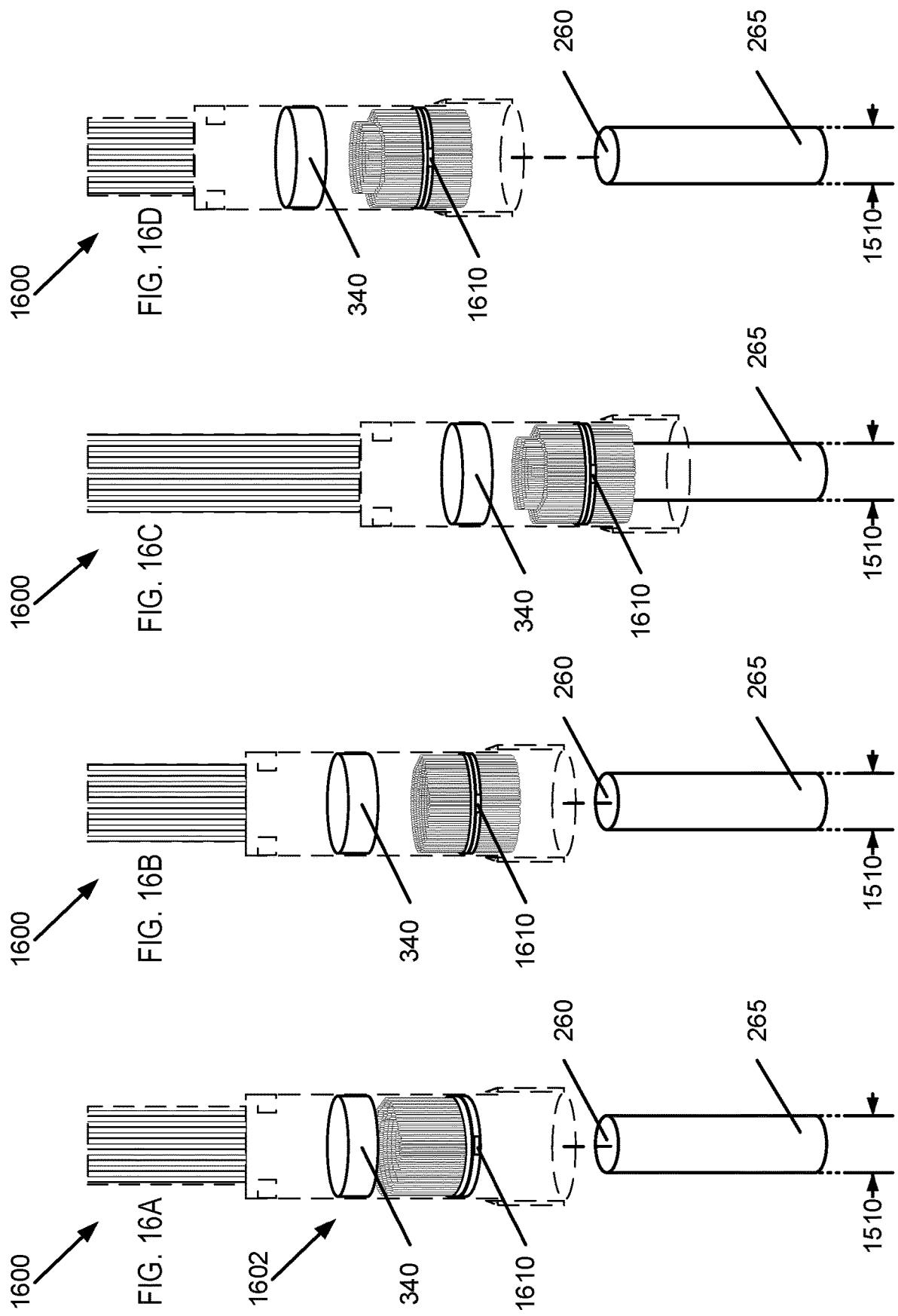

LEAD-FREE PINSCREEN IMPRINT DEVICE, SYSTEM, AND METHOD FOR RETRIEVING AT LEAST ONE IMPRINT OF A TOPMOST SURFACE OF A FISH LOCATED IN A WELLBORE

BACKGROUND

In any industry that performs drilling, an unexpected turn of events can lead to very expensive remedial operations. One of the most expensive events that can occur on the field is losing/dropping objects thousands of feet in a drilled hole. In these cases, fishing operations may be needed. In cases where the shape/position of a top fish is not certain, rig crews may need to run an impression block to determine the position and shape of the top fish. The impression block may be short tubular steel body fitted at its lower section with lead. The impression block may be lowered to obtain an imprint of the top fish, which can help the rig crew to know the shape of the top fish after the imprint device is retrieved.

SUMMARY

In general, in one aspect, embodiments disclosed herein relate to a lead-free pinscreen imprint device for retrieving at least one imprint of a topmost surface of a fish located in a wellbore. The lead-free pinscreen imprint device includes a housing including a central aperture that extends along a section of a central axis thereof. The lead-free pinscreen imprint device includes a pinscreen portion disposed in the housing. The pinscreen portion includes various pins that are disposed along a vertical axis that is parallel to the central axis. Each pin of the various pins includes a top end and a bottom end. Each pin is configured to be independently shifted along the vertical axis upon identifying a pressure at the bottom end. The pinscreen portion includes an imprint surface that faces in a downward direction. The imprint surface is a first plane formed by various bottom ends of the various pins when the imprint surface is in a collecting position. The pinscreen portion includes a scanning surface that faces in an upward direction. The scanning surface is a second plane parallel to the first plane and formed by various top ends of the various pins when the scanning surface is in the collecting position. The lead-free pinscreen imprint device includes a three-dimensional (3D) laser image scanner disposed in the housing at a location that is immediately above the pinscreen portion. The 3D laser image scanner is configured to scan the scanning surface and identify any depth changes in the scanning surface.

In general, in one aspect, embodiments disclosed herein relate to system for retrieving an imprint of a topmost surface of a fish located in a wellbore. The system includes a lead-free pinscreen imprint device. The lead-free pinscreen imprint device includes a housing including a central aperture that extends along a section of a central axis thereof. The lead-free pinscreen imprint device includes a pinscreen portion disposed in the housing. The pinscreen portion includes various pins that are disposed along a vertical axis that is parallel to the central axis. Each pin out of the various pins includes a top end and a bottom end. Each pin out of the various pins is configured to be independently shifted along the vertical axis upon identifying a pressure at the bottom end. The pinscreen portion includes an imprint surface that faces in a downward direction. The imprint surface is a first plane formed by various bottom ends of the various pins when the imprint surface is in a collecting position. The pinscreen portion includes a scanning surface that faces in an upward direction. The scanning surface is a second plane parallel to the first plane and formed by various top ends of the various pins when the scanning surface is in the collecting position. The lead-free pinscreen imprint device includes a 3D laser image scanner disposed in the housing at a location that is immediately above the pinscreen portion. The 3D laser image scanner is configured to scan the scanning surface and identify any depth changes in the scanning surface. The system includes a conveyance mechanism configured to connect to an attachment of the housing. The conveyance mechanism is configured to move the lead-free pinscreen imprint device along the vertical axis. The system includes a control system. The control system controls activation and deactivation of a safety mechanism of the lead-free pinscreen imprint device and determines whether the lead-free pinscreen imprint device has reached the collecting position. After the 3D laser image scanner performs a first scan of the scanning surface, the control system determines whether a 3D image of the topmost surface of the fish can be generated based on the first scan only. If the 3D image of the topmost surface of the fish can be generated based on the first scan only, the control system generates the 3D image of the topmost surface of the fish. If the 3D image of the topmost surface of the fish cannot be generated based on the first scan only, the control system determines a number of subsequent scans to be collected. If the 3D image of the topmost surface of the fish cannot be generated based on the first scan only and after the 3D laser image scanner performs the number of subsequent scans, the control system generates the 3D image of the topmost surface of the fish.

In general, in one aspect, embodiments disclosed herein relate to a method for retrieving at least one imprint of a topmost surface of a fish located in a wellbore. The method includes activating, by a control system, a safety mechanism in a lead-free pinscreen imprint device. The lead-free pinscreen imprint device includes a housing including a central aperture that extends along a section of a central axis thereof. The housing includes an attachment configured to connect a conveyance mechanism that moves the lead-free pinscreen imprint device along a vertical axis. The lead-free pinscreen imprint device includes pinscreen portion disposed in the housing. The pinscreen portion includes various of pins that are disposed along the vertical axis that is parallel to the central axis. Each pin out of the various pins includes a top end and a bottom end. Each pin out of the various pins is configured to be independently shifted along the vertical axis upon identifying a pressure at the bottom end. The pinscreen portion includes an imprint surface that faces in a downward direction. The imprint surface is a first plane formed by various bottom ends of the various pins when the imprint surface is in a collecting position. The pinscreen portion includes a scanning surface that faces in an upward direction. The scanning surface is a second plane parallel to the first plane and formed by various top ends of the various pins when the scanning surface is in the collecting position. The lead-free pinscreen imprint device includes a 3D laser image scanner disposed in the housing at a location that is immediately above the pinscreen portion. The 3D laser image scanner is configured to scan the scanning surface and identify any depth changes in the scanning surface. The lead-free pinscreen imprint device includes the safety mechanism that prevents the various pins from moving. Each pin out of the various pins is free to slide upwards or downwards once the safety mechanism has been deactivated. The method includes lowering, by the conveyance mechanism, the lead-free pinscreen imprint device from a surface into the wellbore and along the vertical axis. The method includes determining, by the control system, whether the lead-free pinscreen imprint device has reached the collecting position. After the 3D laser image scanner performs a first scan of the scanning surface, the method includes determining, by the control system, whether a 3D image of the topmost surface of the fish can be generated based on the first scan only. If the 3D image of the topmost surface of the fish can be generated based on the first scan only, the method includes generating the 3D image of the topmost surface of the fish. If the 3D image of the topmost surface of the fish cannot be generated based on the first scan only, the method includes determining a number of subsequent scans to be collected. If the 3D image of the topmost surface of the fish cannot be generated based on the first scan only and after the 3D laser image scanner performs the number of subsequent scans, the method includes generating the 3D image of the topmost surface of the fish.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

FIGS. 16A-16D show an example of a lead-free pinscreen device retrieving at least one imprint of a topmost surface of a fish located in a wellbore in accordance with one or more embodiments.

DETAILED DESCRIPTION

Figure 1B:
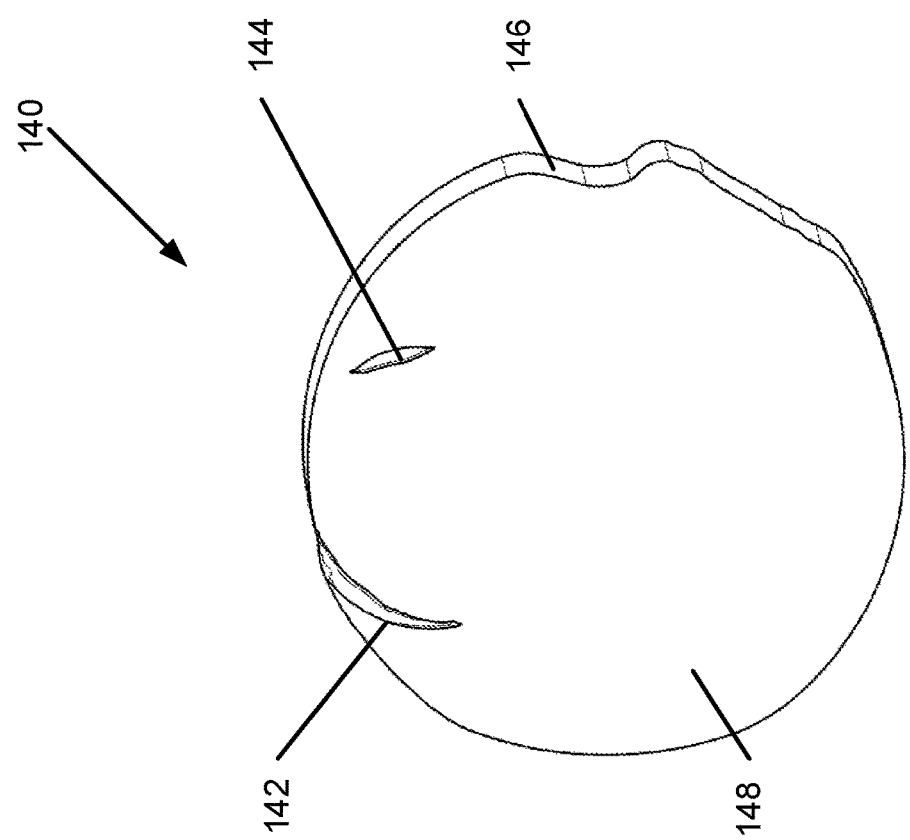
FIGS. 1A and 1B show perspective views of a lead-based impression block.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include lead-free pinscreen imprint device, a system, and a method for retrieving at least one imprint of a topmost surface of a fish located in a wellbore. A pinscreen imprint device may be used to replace conventional lead impression blocks. The pinscreen imprint device may give a clear imprint of a shape, dimension, and orientation of a top fish. This pinscreen imprint device may be run on a fishing string or a wire/slick line which the conventional impression blocks cannot usually do given that they need weight to push them against the top fish to create any impression. The pinscreen imprint device is safe and environmentally friendly because it does not include lead. In one or more embodiments, the pinscreen imprint device may include a tubular body with a threaded box in one end and a crowded array of pins that are free to slide vertically. These pins may be separately monitored by a three-dimensional (3D) laser profile scanner, which may be isolated on another end of the pinscreen imprint device to create a 3D shape. While connected via a wireline, the pinscreen imprint device may send live data, be adjusted, and be reset during an imprint collection process to give the best imprint of the top fish without the need to pull out the pinscreen imprint device. The pinscreen imprint device may be run by pipe and may be fitted with circulation ports to circulate and wash the top fish before taking the impression.

In the pinscreen imprint device, an area between the pins and a 3D laser scanner may be sealed to prevent inflow of drilling fluid and to prevent any obstacle in the way of the laser to scan a preformed shape of the pins. This may be achieved by fitting the pins with O-rings to create a barrier and seal any drilling fluid from flowing into the space between the individual pins and the 3D laser profile scanner. These O-rings may be micro O-rings that are less than 1 mm (millimeter) in size and have a high sealing capability. These O-rings may have a tight fit that creates a resistance to keep the pins extended and prevent any accidental retract due to differential pressure between the inside and outside of the pinscreen imprint device.

Figure 1A:
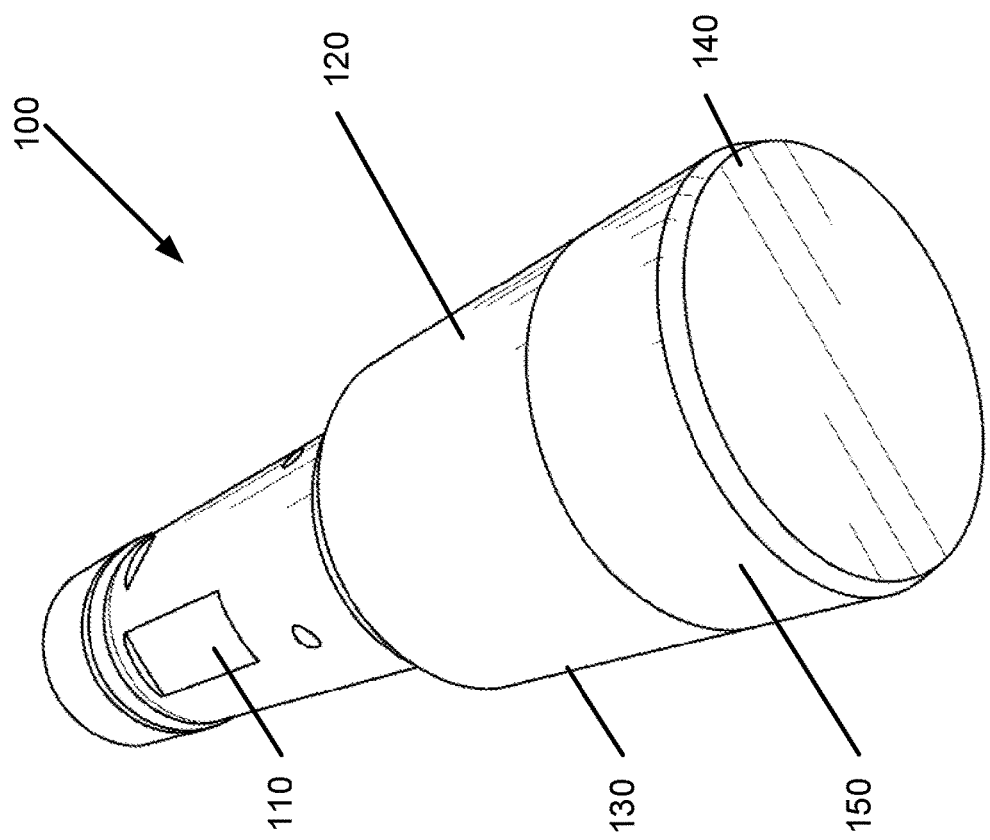

FIGS. 1A and 1B show schematic diagrams illustrating a traditional lead impression block 100. In FIG. 1A, the traditional lead impression block 100 may include a lead surface 150 at a bottom end 140 and a lock-in handle 110 at a top end (opposite to the bottom end 140). The traditional lead impression block 100 may have a body 120 with a cylindrical shape 130. As noted above, the traditional lead impression block 100 does not include any electronic components. Further, the traditional lead impression block 100 is completely void of any pressuring capabilities to generate an imprint on the lead surface 150. As a result, the traditional lead impression block 100 must include a weighted portion in the body 120. As additional weight is required for the weight in the body 120 to create any imprint, the traditional lead impression block 100 is not likely to generate imprints on its own. The weight 120 of the traditional lead impression block 100 will not be enough to create the imprint because the weight to create any imprint may be as low as +−1000 lbs. (pounds) based on application. As a result, the traditional lead impression block 100 is required to be run by pipe or coiled tubing to give the traditional lead impression block 100 extra weight needed to do any imprints. In FIG. 1B, the bottom end 140 of the traditional lead impression block 100 is shown to have only minor imprints from the top of the fish. Usually, these minor imprints 142, 144, 146, and 148, are all the imprints of the top fish that the traditional lead impression block 100 will collect. Specially if part of the top fish has a higher surface, the traditional lead impression block 100 only tags higher sections of the top fish. These minor imprints 142, 144, 146, and 148 are uneven and difficult to understand upon a simple inspection and may lead to additional downtime and work to collect a better imprint of the top of the fish.

Figure 2:
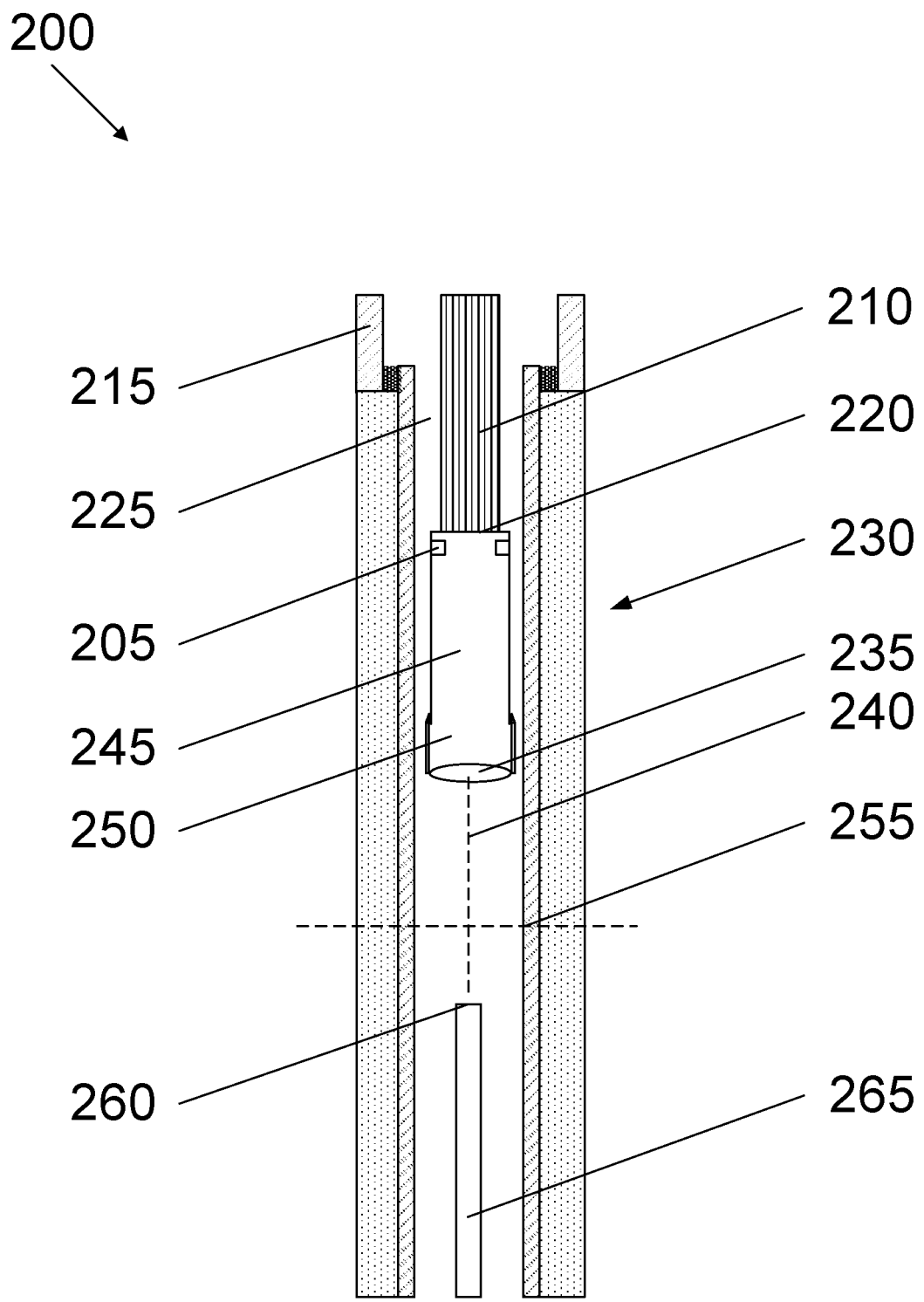
FIG. 2 shows close-up view of a lead-free pinscreen device in accordance with one or more embodiments.

FIG. 2 shows a schematic diagram illustrating a close-up view of system 200 for retrieving an imprint of a topmost surface 260 of a fish 265 located in a wellbore 225. The system 200 includes a lead-free pinscreen imprint device 230 located therewith configured to engage and collect an image of the topmost surface 260. The lead-free pinscreen imprint device 230 has a cylindrical housing 245 with a central aperture 235 that extends through the entire length of the lead-free pinscreen imprint device 230 along a central axis 240 (also referred to as the vertical axis 240). As such, the lead-free pinscreen imprint device 230 may be configured similar to a fishing overshot.

In some embodiments, the lead-free pinscreen imprint device 230 may be attached to a conveyance mechanism 210 at an upper section, which maintains the lead-free pinscreen imprint device 230 at a fixed position in the wellbore 225. In some embodiments, the lead-free pinscreen imprint device 230 may be installed at a bottom end 220 of the conveyance mechanism 210. In some embodiments, the upper section of the lead-free pinscreen imprint device 230 includes one or more ports 205 that may be opened to allow movement of fluids throughout the lead-free pinscreen imprint device 230. A guide portion 250 may be the lowermost component of the lead-free pinscreen imprint device 230. In some embodiments, the lower section of the lead-free pinscreen imprint device 230 may be the guide portion 250 configured to line-up the fish 265 in a vertical direction to overlap the central axis 240. In some embodiments, the guide portion 250 lines-up the fish 265 when the topmost surface 260 of the fish 265 is closer to a liner 215 of the wellbore 225.

In some embodiments, the fish 265 may have a predetermined width. In one or more embodiments, the fish 265 may have a variable width that is different from the predetermined width. For example, the fish 265 may be piping worn out or broken through by drilling harsh formations or harsh drilling operations. In some embodiments, the lead-free pinscreen imprint device 230 may engage the fish 265 using one or more securing mechanisms disposed within the cylindrical housing 245. The lead-free pinscreen imprint device 230 prevents running a single size mechanism for a specific piping with a specific outer diameter. In some embodiments, the lead-free pinscreen imprint device 230 minimizes tripping times in the wellbore 225 and increases the chances to engage the fish 265. In some embodiments, the lead-free pinscreen imprint device 230 may be lowered to a predetermined depth 255.

Figure 3:
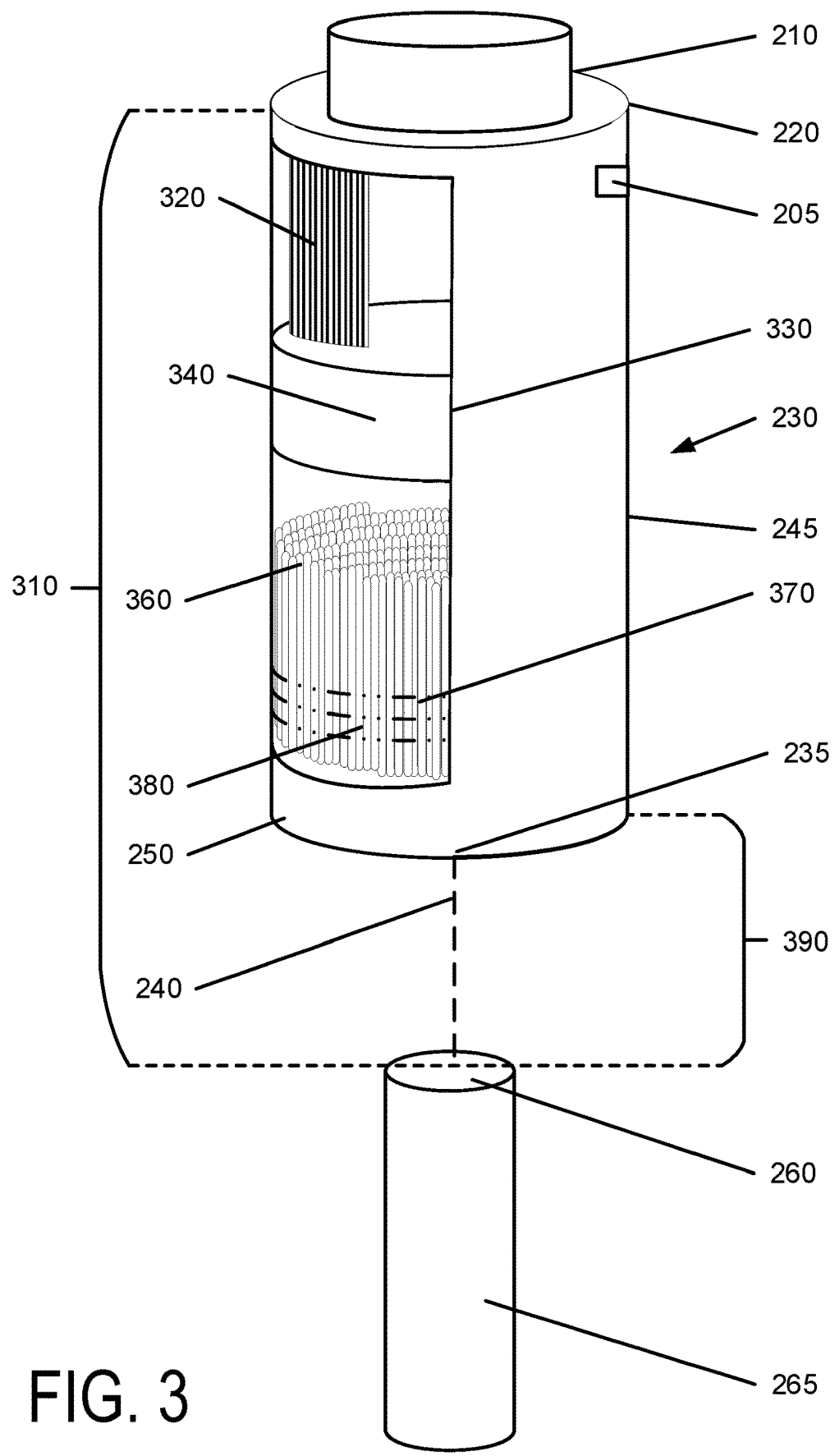
FIG. 3 shows a cross-section view of a lead-free pinscreen device in accordance with one or more embodiments.

FIG. 3 shows a schematic diagram illustrating the lead-free pinscreen imprint device 230 with a cutout 330 which provides a look into the elements disposed inside the cylindrical housing 245. The cylindrical housing 245 extends over a length 310 between the conveyance mechanism 210 and the guide portion 250. The bottom end 220 of the conveyance mechanism 210 may be a coupling surface above the ports 205 including one or more elements for fastening the lead-free pinscreen imprint device 230 to the conveyance mechanism 210. The ports 205 may be threaded holes between 1 inch (1") to 2 inches (2") in size that may be plugged with bolts or cap inserts that may be opened with a certain pressure. The guide portion 250 may include a guide that may be rotated with the cylindrical housing 245 until the guide portion 250 connects with the topmost surface 260 of the fish 265. The guide portion 250 may align the fish 265 in the vertical direction until it overlaps the central axis 240. Once the fish is substantially overlapping the central axis 240, the lead-free pinscreen imprint device 230 may be lowered to engage the topmost surface 260 through the central aperture 235.

In some embodiments, the lead-free pinscreen imprint device 230 includes a plurality of wired connections 320, a 3D laser image scanner 340, a plurality of pins 360, an upper seal 370, and a lower seal 380 disposed within the cylindrical housing 245. In some embodiments, the length 310 is proportional to the cumulative lengths the elements disposed within the cylindrical housing 245. A person of ordinary skill in the art will readily observe that the elements disposed within the cylindrical housing 245 may be arranged in a different manner to that shown in FIG. 3. Specifically, the upper seal 370 and the lower seal 380 may be disposed below the plurality of pins 360. Alternatively, the upper seal 370 and the lower seal 380 may be located at the sides of the plurality of pins 360.

The upper seal 370 and the lower seal 380 may be sealing components that expands inside the lead-free pinscreen imprint device 230 to fasten the plurality of pins 360. In some embodiments, the upper seal 370 and the lower seal 380 include an internal lip that seals around the outer diameter of the plurality of pins to control movement of the plurality of pins 360 in a vertical direction.

The lead-free pinscreen imprint device 230 reduces nonproductive time during tripping and fishing, because the traditional lead impression block 100 cannot be deemed a success without getting pulled out of the hole and closely examined. As a result, multiple runs are required to get the best imprint of the top fish when using the traditional lead impression block 100. In this regard, the lead-free pinscreen imprint device 230 may be run via pipe or wireline which may send real-time data to surface giving us the ability to examine the shape, size of top fish while tool still on bottom. The lead-free pinscreen imprint device 230 may be set at a predetermined height 390 from the topmost surface 260.

Figure 4:
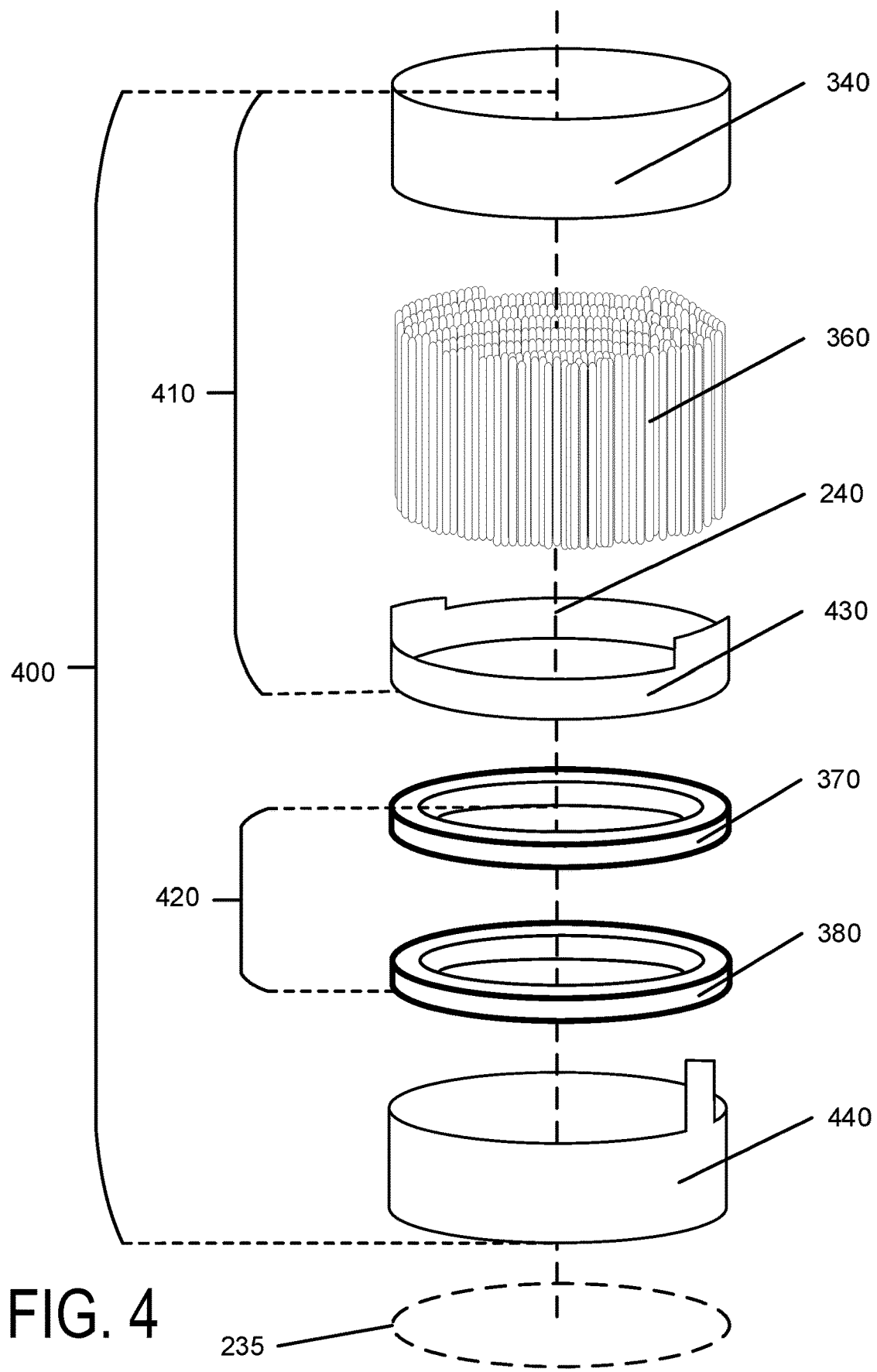
FIG. 4 shows an exploded view of a lead-free pinscreen device in accordance with one or more embodiments.

FIG. 4 shows a schematic diagram illustrating an exploded view of the elements disposed within the cylindrical housing 245 of the lead-free pinscreen imprint device 230. The elements disposed within the cylindrical housing 245 may be internal hardware 400 assembled for retrieving an imprint of the topmost surface 260. The internal hardware 400 may include the 3D laser image scanner 340, the plurality of pins 360, the upper seal 370, and the lower seal 380. In some embodiments, the internal hardware 400 includes a sealing section 420 including the upper seal 370 and the lower seal 380 disposed between a packer 440 and a case 430. In some embodiments, the lead-free pinscreen imprint device 230 may include the 3D laser image scanner 340 and the plurality of pins 360 protected with the case 430 in an image collection portion 410. In some embodiments, the internal hardware is arranged centered along the central axis 240 and inside the central aperture 235 of the cylindrical housing 245.

Figure 5:
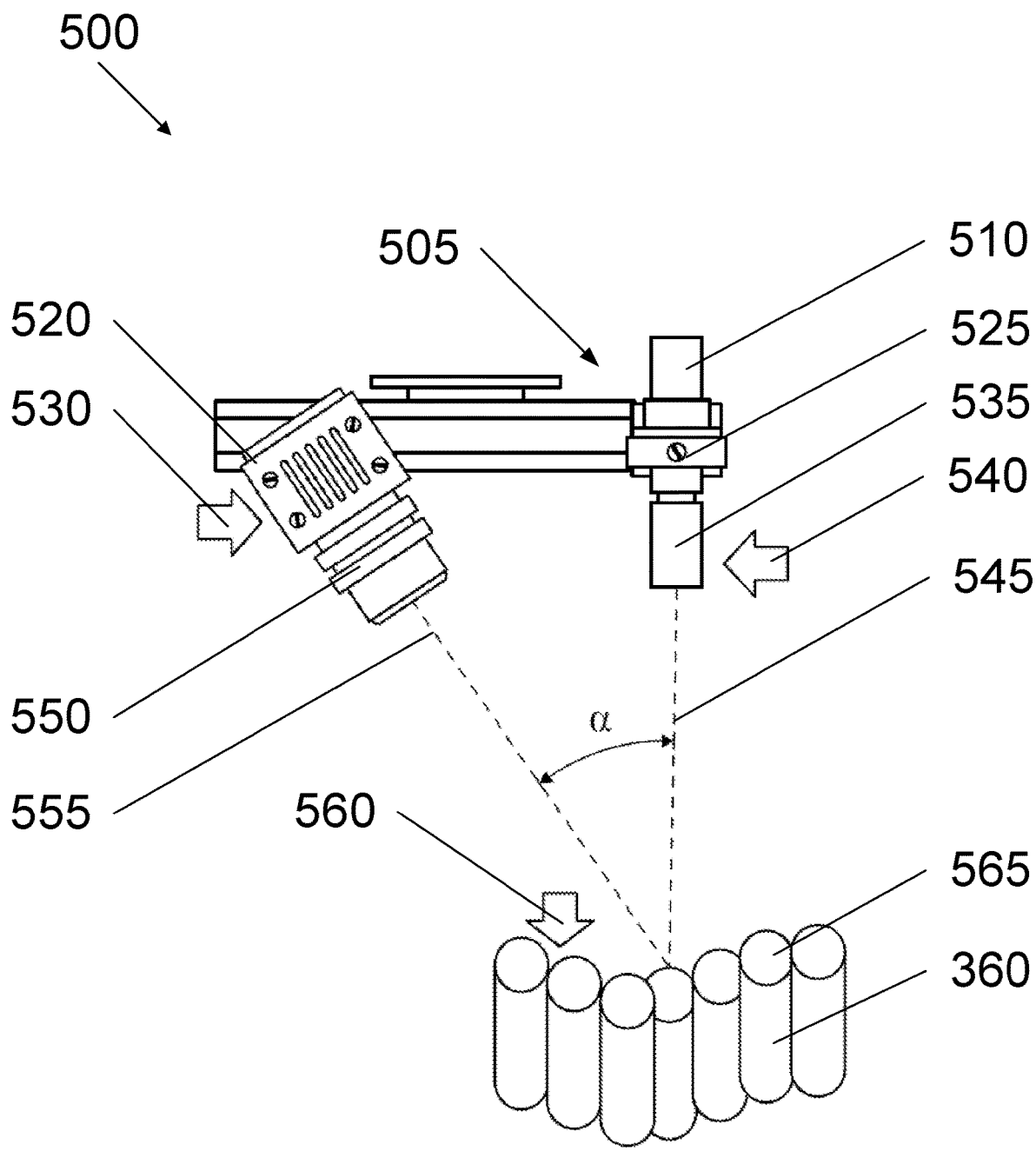
FIGS. 5-7 shows close-up view of the operations of a lead-free pinscreen device in accordance with one or more embodiments.

FIG. 5 shows a close-up look of the image collection portion 410. The image collection portion 410 may include a pinscreen portion 500. The pinscreen portion 500 may include an image scanner 505 and the plurality of pins 360. The image scanner 505 may include a location camera 520 that uses a first line of sight (LOS) 555 to form an angle alpha (a) with respect to a second LOS 545 of a light source 535 after bouncing in a downward direction 560 towards a scanning surface 565 of the plurality of pins 360. The location camera 520 is a retractable sensor that obtains light that bounces from any of the pins from a light source 535. These devices may be adjusted based on the application needed such that the location camera 520 may be moved in a first direction 530 closer to the light source 535 and the light source 535 may be moved in a second direction 540 closer to the location camera 520 to control a size of angle alpha.

The image scanner 505 may include a wireless receiver 525 that obtains information from a control system located at a surface of a well site. The strength of the light source 535 may be modified based on a rotation of a rotor 510. A focus of the location camera 520 may be control based on a rotation of the wheel 550.

In one or more embodiments, the plurality of pins 360 that are disposed along a vertical axis that is parallel to the central axis. Each pin out of the plurality of pins 360 may include a top end and a bottom end and each pin out of the plurality of pins 360 may be configured to be independently shifted along the vertical axis upon identifying a pressure at the bottom end. An imprint surface may be a surface that faces in the downward direction 560. The imprint surface may be a first plane formed by a plurality of bottom ends of the plurality of pins 360 when the imprint surface is in a collecting position (without movement of any of the pins). The scanning surface 565 may be a surface that faces in an upward direction (opposite to the downward direction 560). The scanning surface 565 may be a second plane parallel to the first plane and formed by a plurality of top ends of the plurality of pins 360 when the scanning surface is in the collecting position.

In one or more embodiments, to accurately measure a linear distance of each pin is called a laser triangulation method. In this regard, the laser triangulation may emit a laser light though the light source 535. The laser beam may be reflected from an impacted pin to location camera 520. The laser beam and the location camera 520 may be both pointed at a target pin. In this case, by having a known angular offset (e.g., the angle alpha) between the laser source and the camera sensor, the image scanner 505 may measure depth differences using trigonometry. To this point, the light reflected from different distances strikes the sensor in different locations. To speed up the scanning, a laser line may be projected at the target, rather than just a single point.

Figure 6:
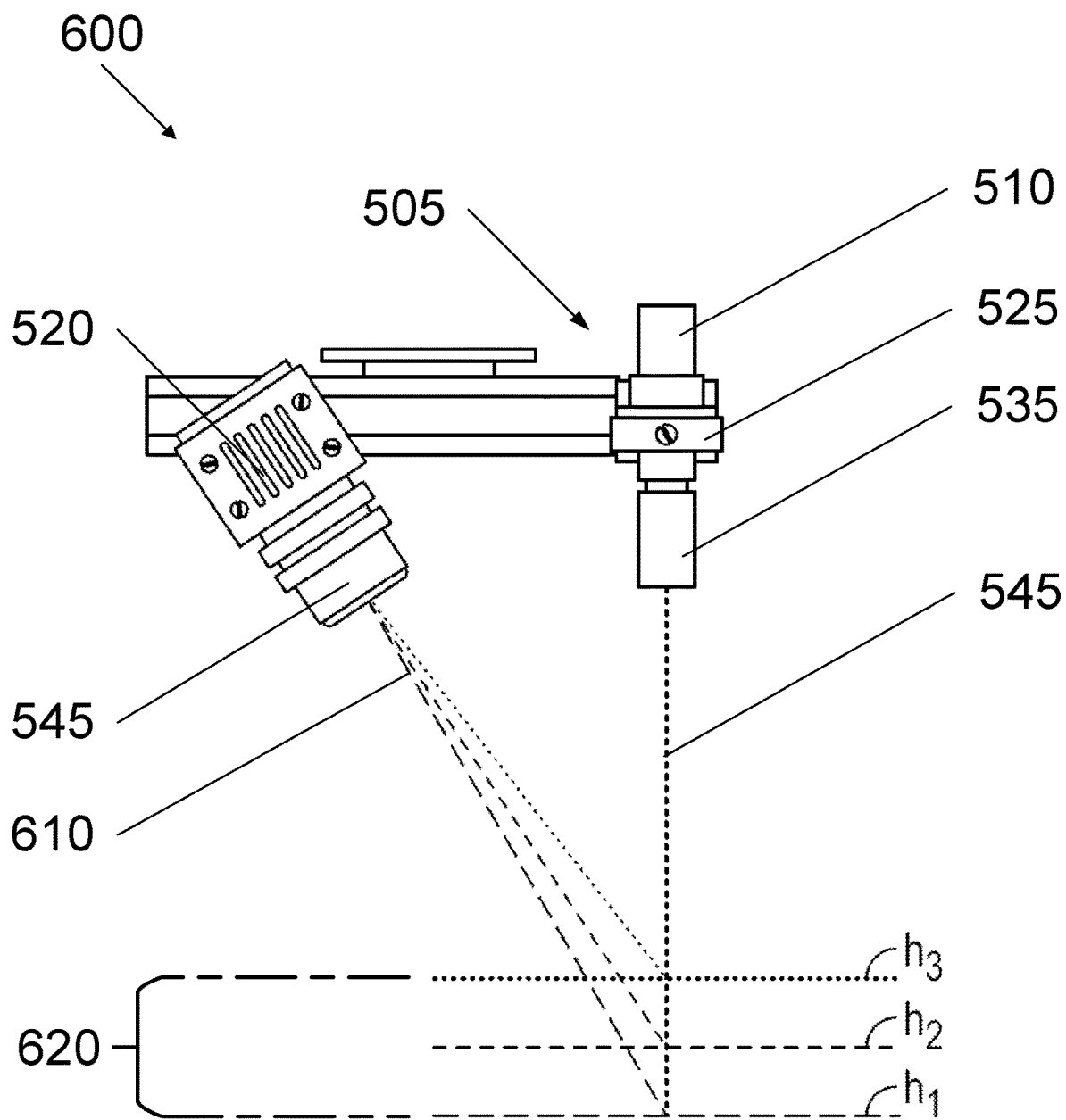
Figure 7:
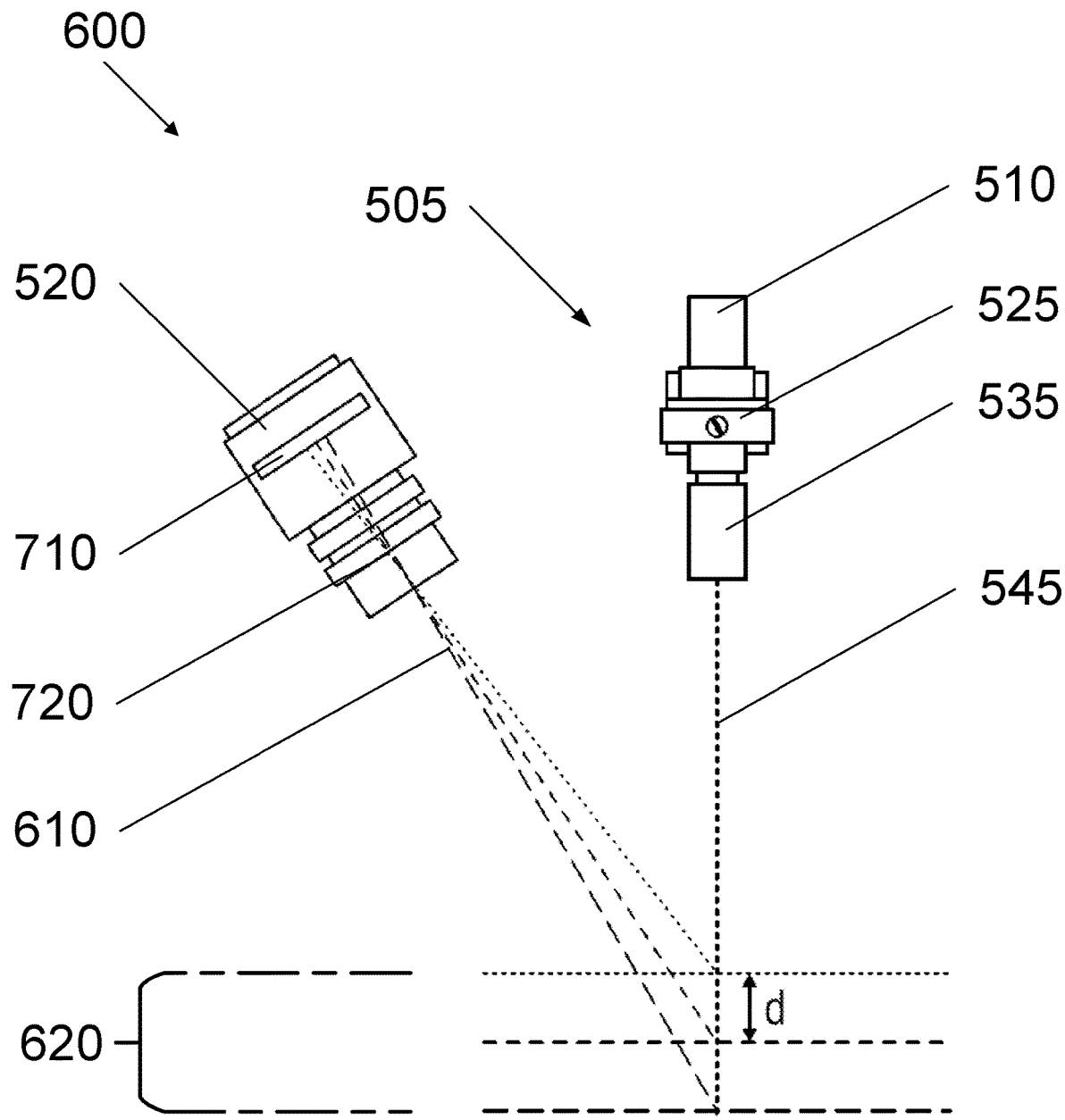

FIGS. 6 and 7 show a close-up look of a pinscreen portion 600 of the image collection portion 410. In FIG. 6, the location camera 520 may implement a ranged LOS 610 that combines multiple angles alpha with respect to the second LOS 545. As the second LOS 545 maintains its position, the location camera 520 may adjust to obtain multiple heights ($h_1$, $h_2$, and $h_3$) over a predetermined range 620. In this regard, FIG. 7 shows that the multiple heights may be correlated to an internal lens 710 as it changes the height and a focal point 720 remains the same. In some embodiments, the position where the reflected laser strikes the internal lens 710 is dependent on the vertical distance of the plurality of pins 360, from the laser and camera assembly in the pinscreen portion 600. As such, the location on the internal lens 710 to which the reflected light is detected changes as the vertical distance of the predetermined range 620 (i.e., the target surface) changes. In this regard, the multiple heights ($h_1$, $h_2$, and $h_3$) are representative of an offset distance that may cause the reflected light to strike the internal lens 710 at different locations. Based on this principle, the vertical distance between the plurality of pins 360 may be calculated to produce the final 3D image. The multiple heights may be separated by a predetermined distance (d), which may be a same distance between any two consecutive heights out of the multiple heights.

Figure 8A:
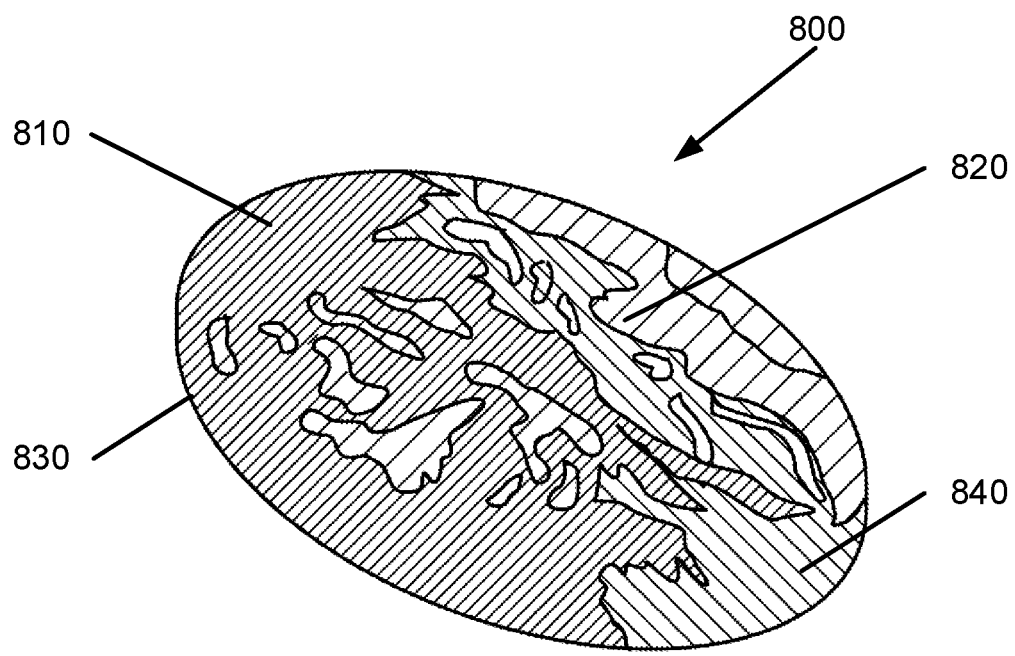
FIGS. 8A and 8B show an example of an image generated by a lead-free pinscreen device in accordance with one or more embodiments.
Figure 8B:
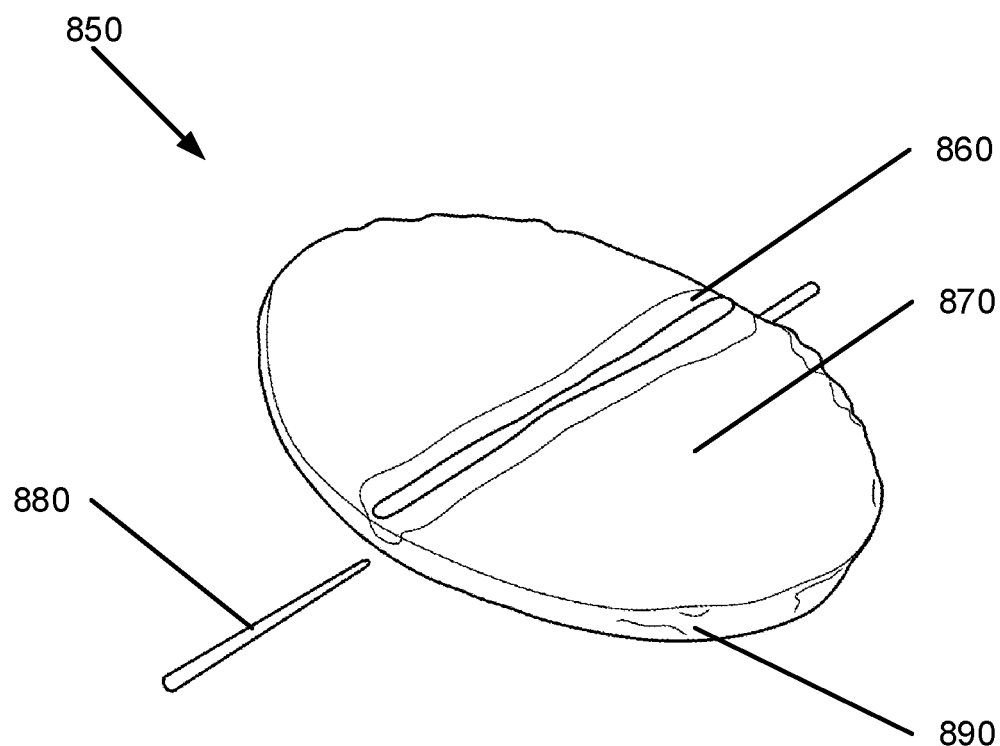

FIGS. 8A and 8B show an example image 800 and an example scanned surface 860. The scanned surface is a potato slice 850 cut with a clean knife. As seen in surface 870, the naked eye may not interpret any changes on the potato slice 850. However, using the image collection portion 410 in the manner described in FIGS. 5-7, the potato slice 850 may be sampled over a length 880 covering the entire width of the surface 870 irrespective of a corresponding thickness 890. As shown in FIG. 8A, the example image 800 is generated to show any topographical changes on the surface 870. Specifically, the topographical changes may include shallow areas 810, medium-range areas 840, and high points 820 in the surface 870 for a circumference 830 of the potato slice 850.

Figure 9:
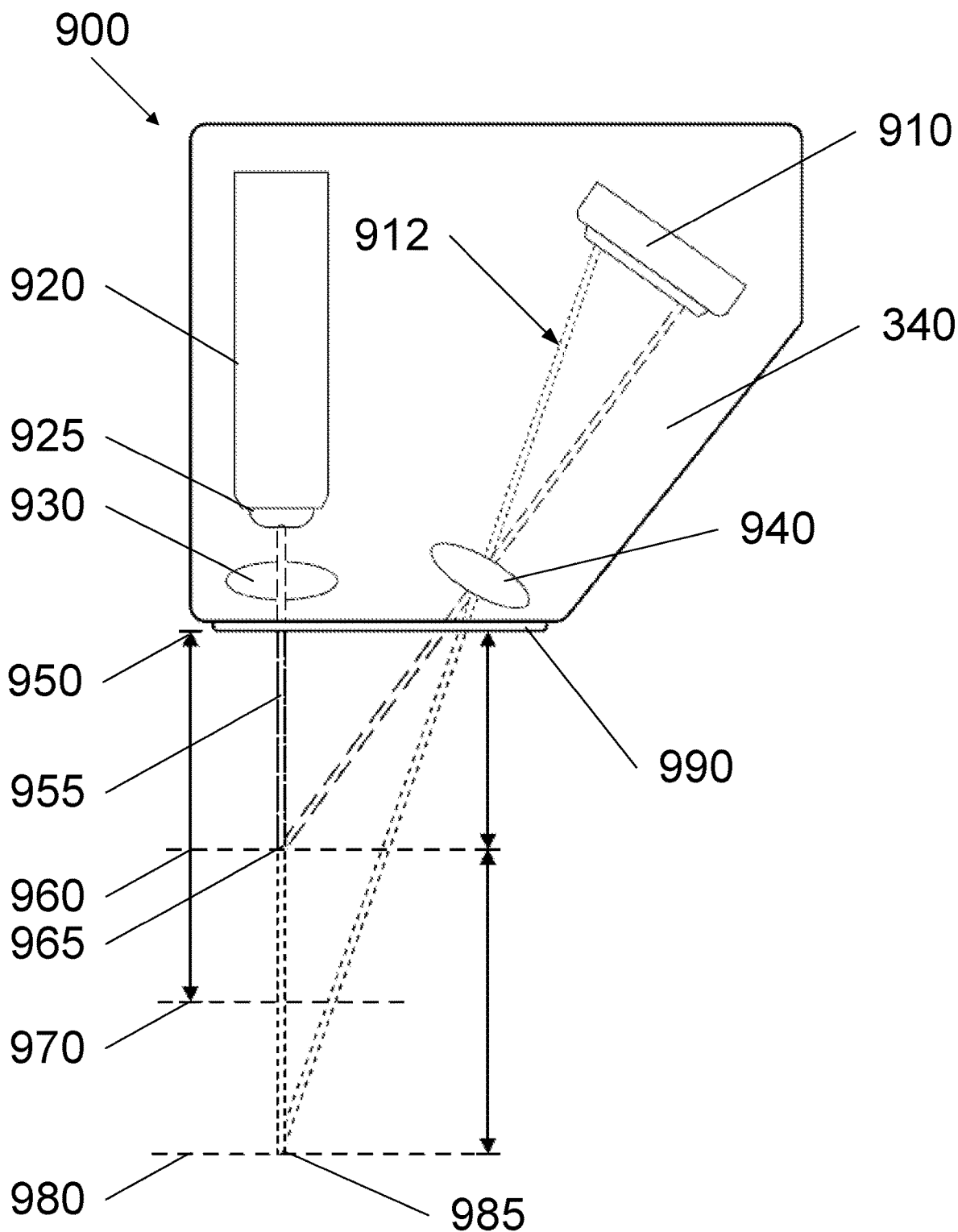
FIG. 9 shows close-up view of the operations of a lead-free pinscreen device in accordance with one or more embodiments.

FIG. 9 shows an example of a compact sensor arrangement 900 that includes a laser emitter 920 and a collecting device 910. During operations, the laser emitter 920 has a central outlet 925 and through a focal point 930 to generate a straight LOS 955 for the laser generated. The collecting device 910 may receive multiple laser beams 912 that are inverted through a focal point 940 after the reflection of the laser from the straight LOS 955 bounces back through a sensor gate 990 and into the compact sensor arrangement 900. In some embodiments, different heights 960 and 980 cause the light to bounce corresponding reflection points 965 and 985, respectively. Depending on the shape and aperture available for the reflection to bounce into the sensor gate 990, the collecting device 910 may not receive a reflection from other heights, such as height 970.

Figure 10:
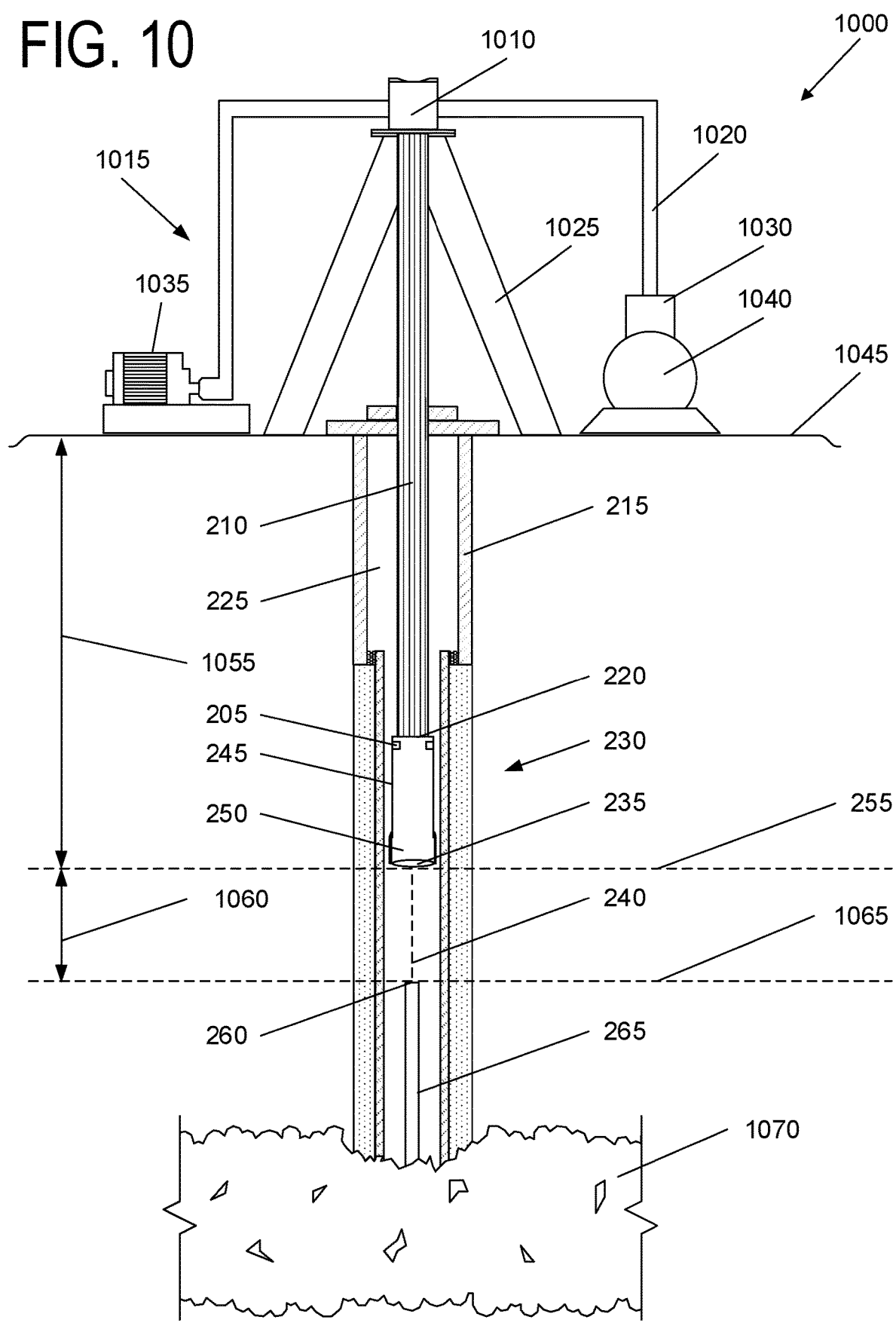
FIGS. 10-13 show a system retrieving at least one imprint of a topmost surface of a fish located in a wellbore in accordance with one or more embodiments.

FIG. 10 shows a schematic diagram illustrating the lead-free pinscreen imprint device 230 disposed on the wellbore 225 of a well system 1000. The well system 1000 may include surface equipment including actuating devices 1035, sensors 1030, and control systems 1040 connected to one another using hardware and/or software to create interfaces 1020. Further, the well system 1000 may be propped by structures 1025 from a rig floor 1045. The well system 1000 includes the wellbore 225 extending from the rig floor 1045 to an underground formation 1070. The underground formation 1070 may have porous areas including hydrocarbon pools that may be accessed through the wellbore 225. In some embodiments, the lead-free pinscreen imprint device 230 is translated in a vertical direction along the wellbore 225 using the surface equipment.

The well system 1000 includes a well 1015 extending below the earth surface into the underground formation ("formation") 1070. The formation 1070 may include a porous or fractured rock. A subsurface pool of hydrocarbons, such as oil and gas, also known as a reservoir, may be located in the formation 1070. The well 1015 includes the wellbore 225 that extends from a wellhead at the surface to a target zone in formation 1070 the target zone may be where the reservoir (not shown separately) is located. The well 1015 may further include liner 215 in the innermost surface of the wellbore 225. In the illustrated example, casings extend into the portion of wellbore 225 penetrating the formation 1070. In other implementations, the portion of wellbore 225 penetrating the formation 1070 may be uncased or open, and fluid communication between the formation 1070 and may occur through an open wall section of the well 1015.

The wellbore 225 may facilitate the circulation of drilling fluids during drilling operations. The flow of hydrocarbon production ("production") (e.g., oil and gas) from the reservoir to the surface during production operations, the injection of substances (e.g., water) into the formation 1070 or the during injection operations, or the communication of monitoring devices (e.g., logging tools or logging devices) into the formation 1070 or the reservoir during monitoring operations (e.g., during in situ logging operations).

The well system 1000 may include a well control system ("control system") 1040. In some embodiments, during operation of the well system 1000, the control system 1040 may collect and record wellhead data for the well system 1000. The control system 1040 may include flow regulating devices that are operable to control the flow of substances into and out of wellbore 225. For example, control system 1040 may include one or more production valves (not shown separately) that are operable to control the flow of production in the well system 1000 during well completion operations, well maintenance operations, and reservoir monitoring, assessment, and development operations. In some embodiments, the control system 1040 may regulate the movement of the conveyance mechanism 210 by modifying the power supplied to the actuating devices 1035. The conveyance mechanism 210 may be a wireline mechanism, a slick line mechanism, or a mechanism comprising a plurality of tubulars (i.e., pipes) coupling the lead-free pinscreen imprint device 230 to the structures 1025. The conveyance mechanism 210 may be a special mechanical device used to aid the recovery of equipment lost in the well 1015.

In some embodiments, the actuating devices 1035 may be motors or pumps connected to the conveyance mechanism 210 and the control system 1040. The control system 1040 may be coupled to the sensors 1030 to sense characteristics of substances and conditions in the wellbore 225, including production when the well 1015 is a production well.

In some embodiments, the fish 265 is disposed at a sampling depth 1065. The sampling depth 1065 may be defined as a distance 1060 from the predetermined depth 255 to the topmost surface 260. The predetermined depth 255 may be a pre-established distance 1055 from the rig floor 1045.

In some embodiments, the measurements are recorded in real-time, and are available for review or use within seconds, minutes, or hours of the condition being sensed (e.g., the measurements are available within 1 hour of the condition being sensed). In such an embodiment, the wellhead data may be referred to as "real-time" wellhead data. Real-time data may enable an operator of the well system 1000 to assess a relatively current state of the well system 1000 and make real-time decisions regarding development of the well system 1000 and the reservoir, such as on-demand adjustments in regulation of production flow from the well 1015.

Figure 11:
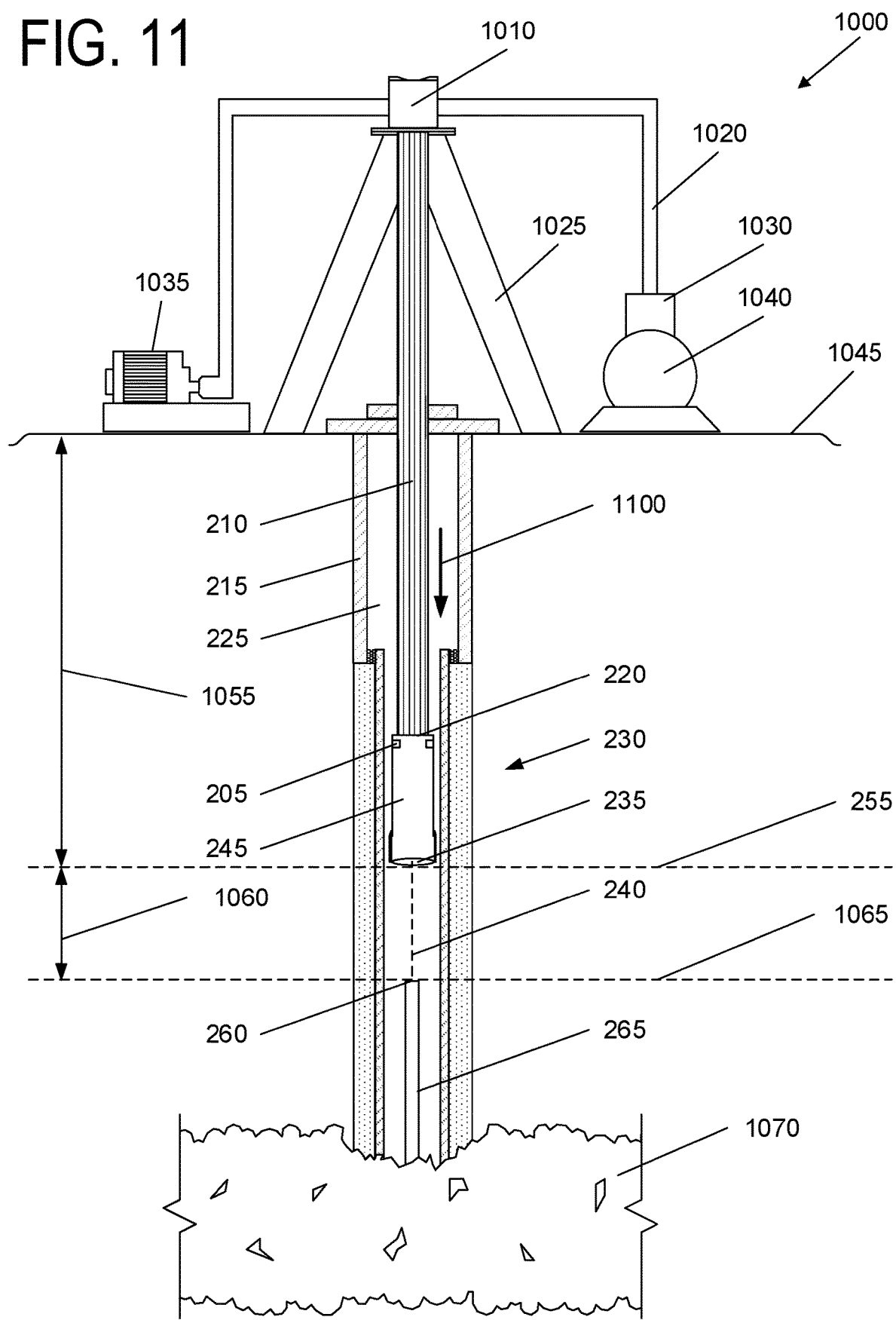

FIG. 11 shows an example of the lead-free pinscreen imprint device 230 being lowered into the wellbore 225 to retrieve at least one imprint of the topmost surface 260. In some embodiments, the lead-free pinscreen imprint device 230 is lowered into the wellbore 225 using the conveyance mechanism 210 rolled from the rig floor 1045 of the well system 1015 in a downward direction 1100. In some embodiments, the conveyance mechanism 210 is rolled by the actuating devices 1035 coupled to the structures 1025. The actuating devices 1035 and the structures 1025 operate to lower or raise the conveyance mechanism 210. In this case, the actuating devices 1035 and the structures 1025 are used for lowering the lead-free pinscreen imprint device 230 into a depth above a depth of the topmost surface 260 of the fish 265. In some embodiments, the interfaces 1020 includes controls for monitoring and operating the movement of the conveyance mechanism 210 using a hydraulic pump (not shown).

Figure 12:
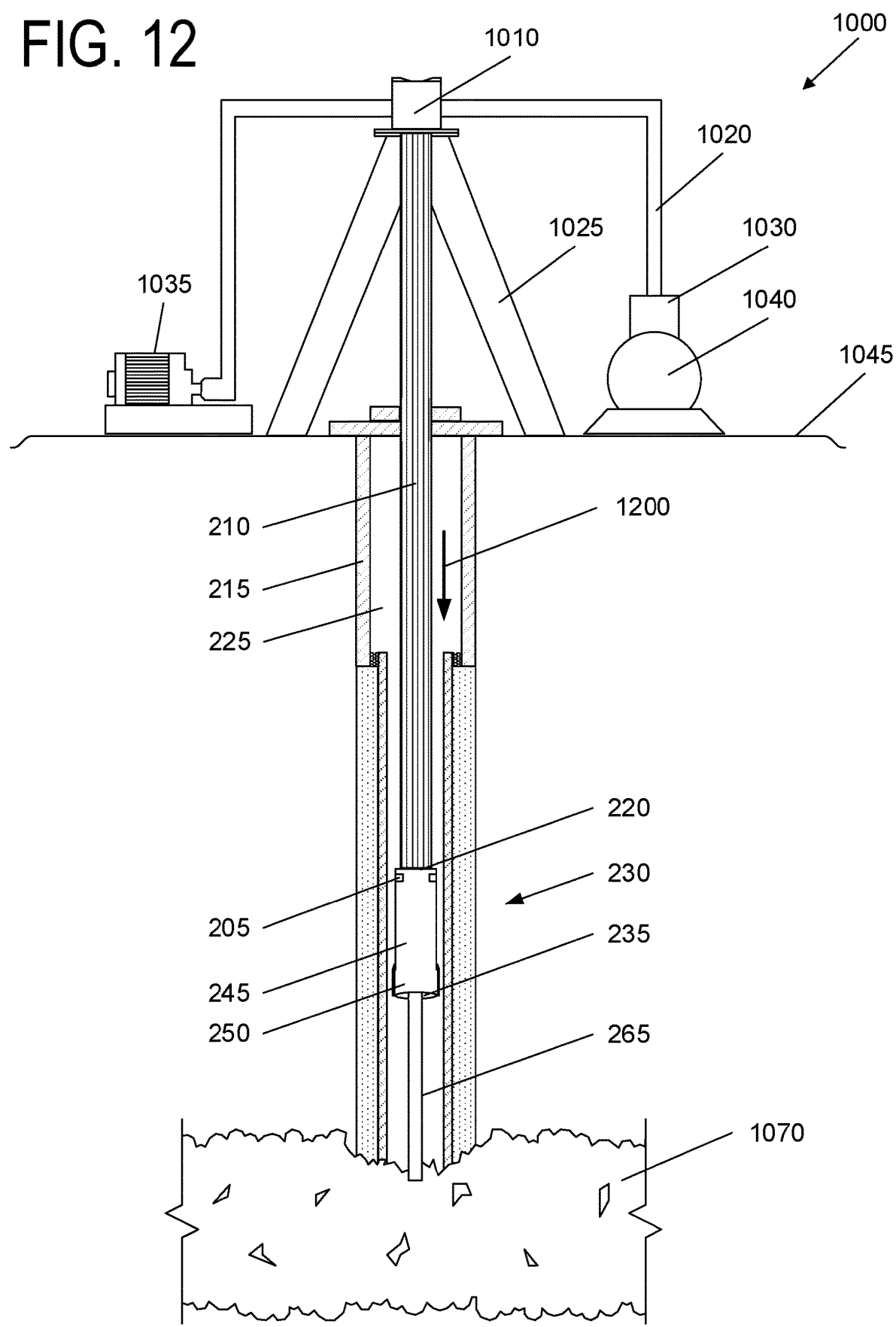

FIG. 12 illustrates an example of the lead-free pinscreen imprint device 230 engaging the fish 265. The lead-free pinscreen imprint device 230 is lowered onto the topmost surface 260 of the fish 265 following a consistent downward direction 1200. In this case, the guide portion 250 in the lead-free pinscreen imprint device 230 engages the fish 265. The guide portion 250 engages the topmost surface 260 into the central aperture 235 and allows the topmost surface 260 to push against a number of pins in the lead-free pinscreen imprint device 230. As it will be described in reference to FIGS. 15A-16D, the pins are pushed in proportion to a shape and topology of the topmost surface 260. The lead-free pinscreen imprint device 230 may include at least one safety element that locks the pins in place once the topmost surface 260 is covered and the lead-free pinscreen imprint device 230 is lowered for a period of time. This period of time may be a predetermined number of seconds or minutes that allow an imprint to be collected. The imprint may be reported through wireline to the control system 1040 on the rig floor 1045.

Figure 13:
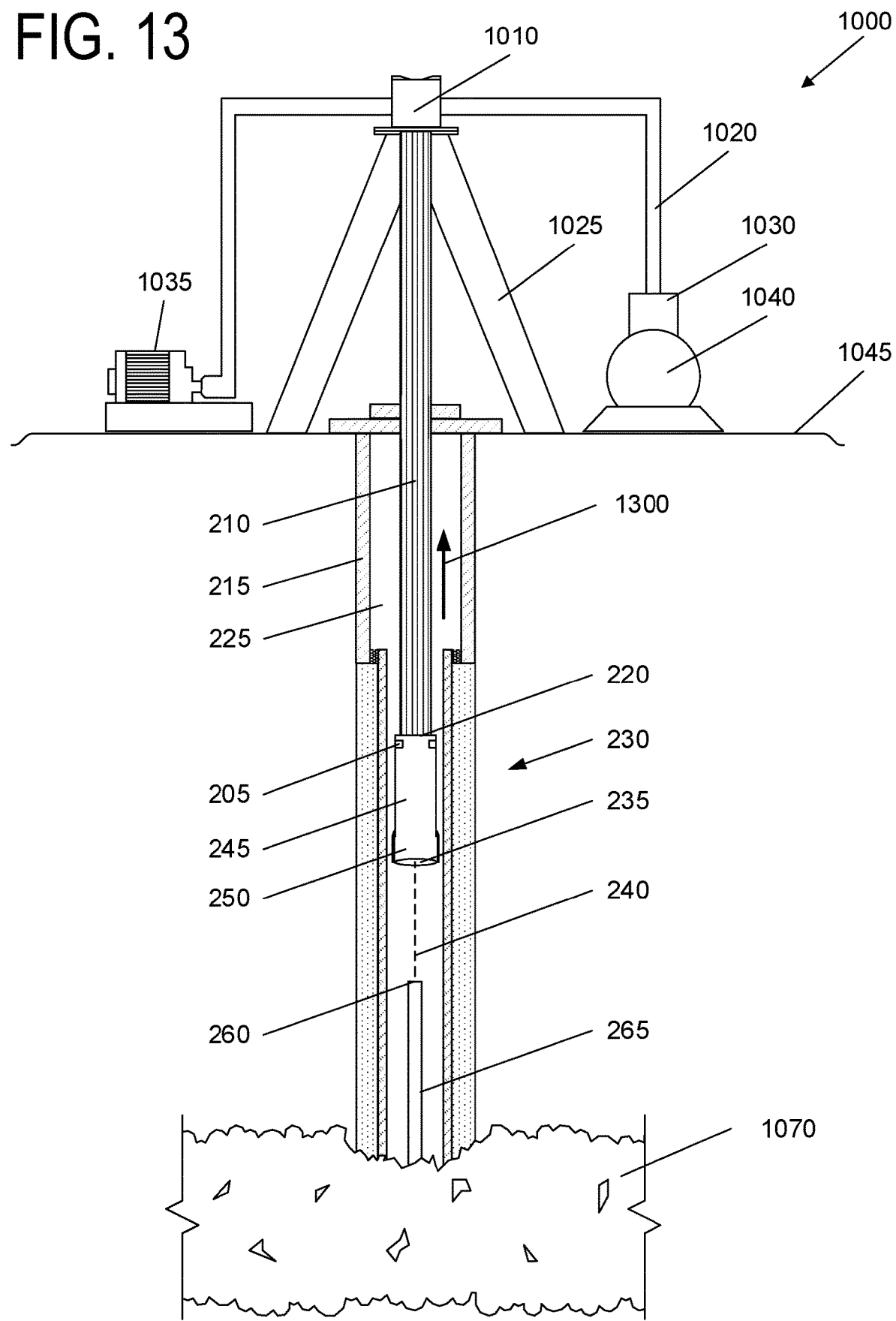

FIG. 13 shows an example of the lead-free pinscreen imprint device 230 moving along the wellbore 225 in an upward direction 1300. The lead-free pinscreen imprint device 230 is lifted once the imprint of the topmost surface 260 is collected. The lead-free pinscreen imprint device 230 may include at least one sensor that determines that the imprint has been collected. In this case, the conveyance mechanism 210 is lifted in a straight direction while avoiding any rotation of the lead-free pinscreen imprint device 230.

Figure 14:
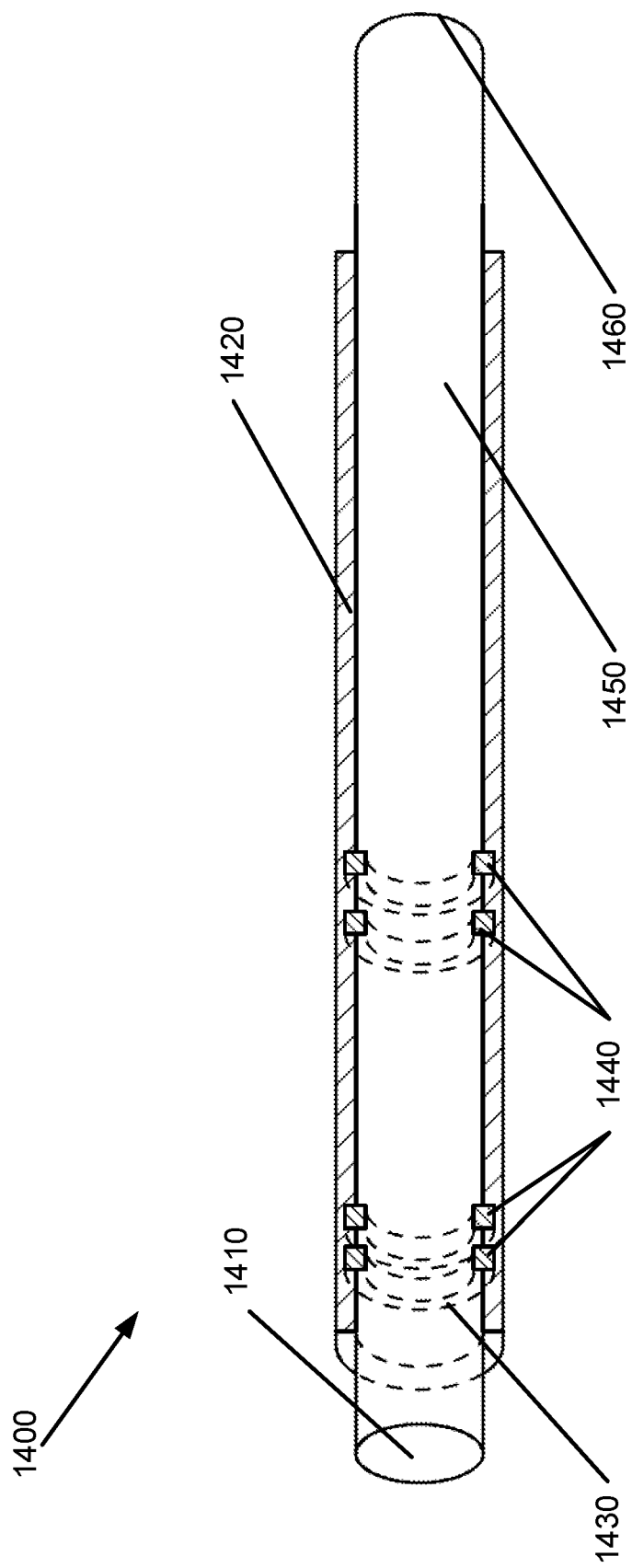
FIG. 14 show a cross section view of a pin for a lead-free pinscreen device in accordance with one or more embodiments.

FIG. 14 shows a perspective view of engagement means 1400. The engagement means may include a casing 1420 coupled to a pin 1450. In one or more embodiments, the engagement means 1400 have a cylindrical shape and a circular transversal cross section. As shown in the longitudinal cross section 1420 of the casing 1420, a plurality of sealing elements 1440 may be embedded in an internal face 1430 of the casing 1420. The plurality of sealing elements 1440 allow the pin 1450 to move on either direction of the casing 1420 while preventing fluid to pass through between the casing 1240 and the pin 1450. In some embodiments, the casing 1420 is shorter in length than the pin 1450. The casing 1420 may hold a section of the pin 1450 while at least one of a bottom end 1410 and/or an upper end 1460 remains outside the casing 1420.

Figure 15A:
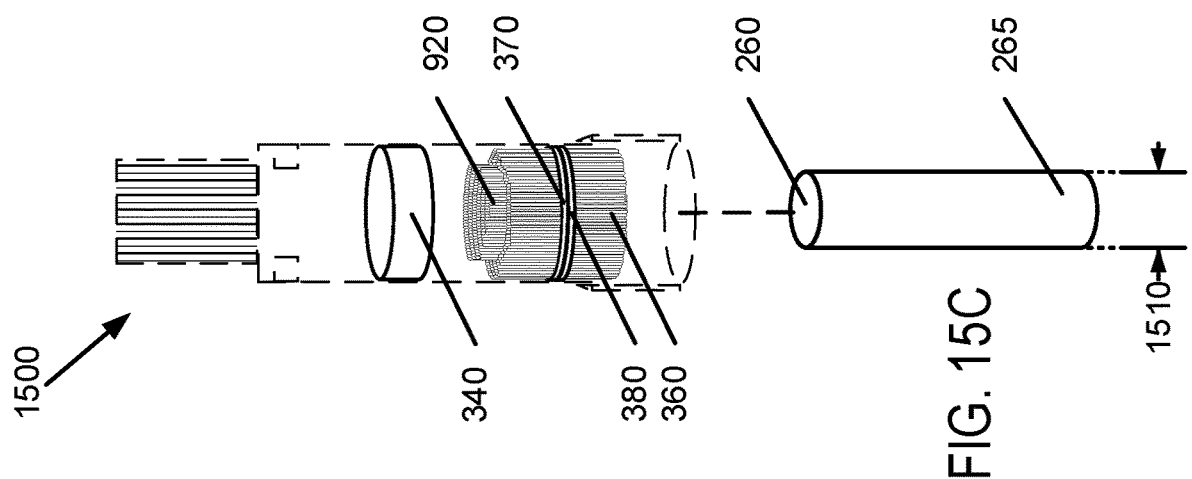
FIGS. 15A-15C show an example of a lead-free pinscreen device retrieving at least one imprint of a topmost surface of a fish located in a wellbore in accordance with one or more embodiments.
Figure 15B:
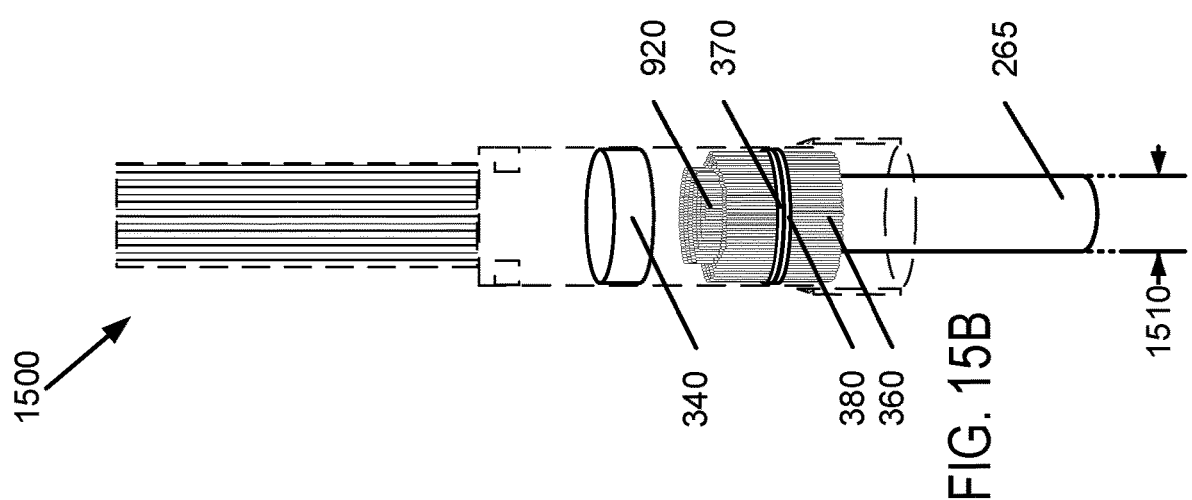
Figure 15C:
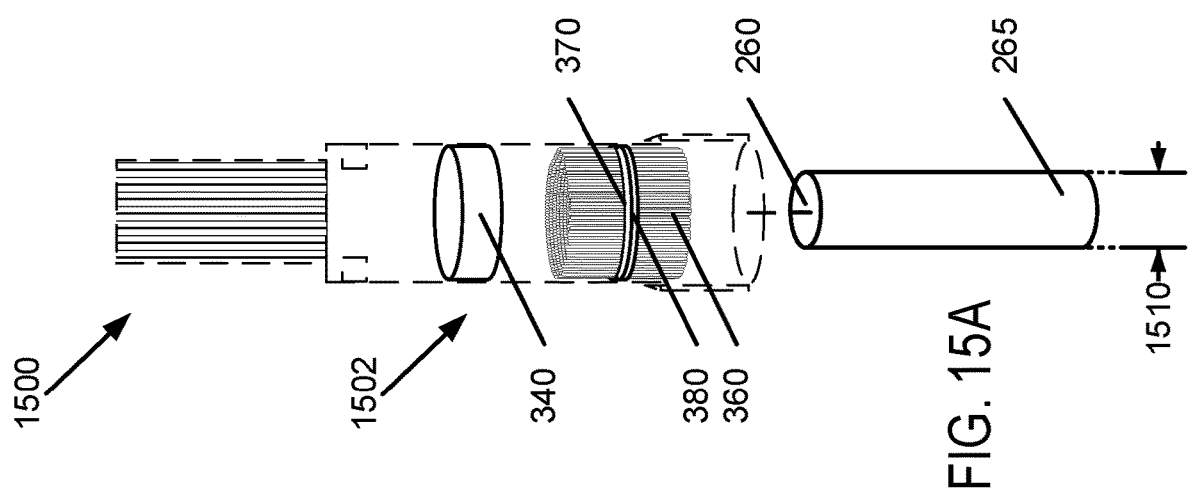

FIGS. 15A-15C show schematic diagrams illustrating an example of the lead-free pinscreen device 230 retrieving at least one imprint of the topmost surface 260 of the fish 265. In FIGS. 15A-15C, an imprint collection process 1500 includes the 3D laser image scanner 340 and the plurality of pins 360. The plurality of pins 360 held in place though an inward pressure exerted by the upper seal 370 and the lower seal 380. According to the imprint collection process 1500, when the plurality of pins 360 are lowered on to the topmost surface 260, an imprint force (not shown) may be exerted from the topmost surface 260 to raise a proportional number of pins 920 out of the plurality of pins 360. The imprint force may be equal to a normal force (not shown) proportional to the weight of the plurality of pins 360 exerted on the topmost surface 260. As the plurality of pins 360 are dropped on the topmost surface 260, the topmost surface 260 pushes back on the imprint surface.

FIG. 15A shows the lead-free pinscreen device 230 in a collecting position 1502. As described above, in the pinscreen portion 500, the imprint surface is a plane formed by a plurality of bottom ends of the plurality of pins 360 when the lead-free pinscreen device 230 is in a collecting position 1502. Further, the scanning surface 565 may be a surface that faces in an upward direction. The scanning surface 565 may be a plane formed by a plurality of top ends of the plurality of pins 360 when the lead-free pinscreen device 230 is in the collecting position 1502. In FIGS. 15B and 15C, as the lead-free pinscreen device 230 is lowered and the imprint is collected, the proportional number of pins 920 is equal to a thickness 1510 of the fish 260.

FIGS. 16A-16D show schematic diagrams illustrating an example of the lead-free pinscreen device 230 retrieving at least one imprint of the topmost surface 260 of the fish 265. In FIGS. 16A-16D, an imprint collection process 1600 includes the 3D laser image scanner 340 and the plurality of pins 360. The plurality of pins 360 held in place though an inward pressure exerted by the upper seal 370 and the lower seal 380. The plurality of pins 360 may be additionally held in place through a safety mechanism 1610 that prevents the plurality of pins 360 from moving such that each pin out of the plurality of pins 360 may only be free to slide upwards or downwards once the safety mechanism 1610 has been deactivated. The safety mechanism 1610 may be activated upon deployment of the lead-free pinscreen imprint device 230. The safety mechanism 1610 may be configured to automatically deactivate upon identifying that the lead-free pinscreen imprint device 230 is in a collecting position 1602. The safety mechanism 1610 may be configured to automatically re-activate upon identifying that the lead-free pinscreen imprint device 230 is done collecting the imprint.

According to the imprint collection process 1600, when the plurality of pins 360 are lowered on to the topmost surface 260, an imprint force (not shown) may be exerted from the topmost surface 260 to raise a proportional number of pins 920 out of the plurality of pins 360. The imprint force may be equal to a normal force (not shown) proportional to the weight of the plurality of pins 360 exerted on the topmost surface 260. As the plurality of pins 360 are dropped on the topmost surface 260, the topmost surface 260 pushes back on the imprint surface.

FIG. 16A shows the lead-free pinscreen device 230 in the collecting position 1602. As described above, in the pinscreen portion 500, the imprint surface is a plane formed by a plurality of bottom ends of the plurality of pins 360 when the lead-free pinscreen device 230 is in a collecting position 1602. Further, the scanning surface 565 may be a surface that faces in an upward direction. The scanning surface 565 may be a plane formed by a plurality of top ends of the plurality of pins 360 when the lead-free pinscreen device 230 is in the collecting position 1602. In FIGS. 16B-16D, as the lead-free pinscreen device 230 is lowered and the imprint is collected, the proportional number of pins 920 is equal to a thickness 1510 of the fish 260.

Figure 17:
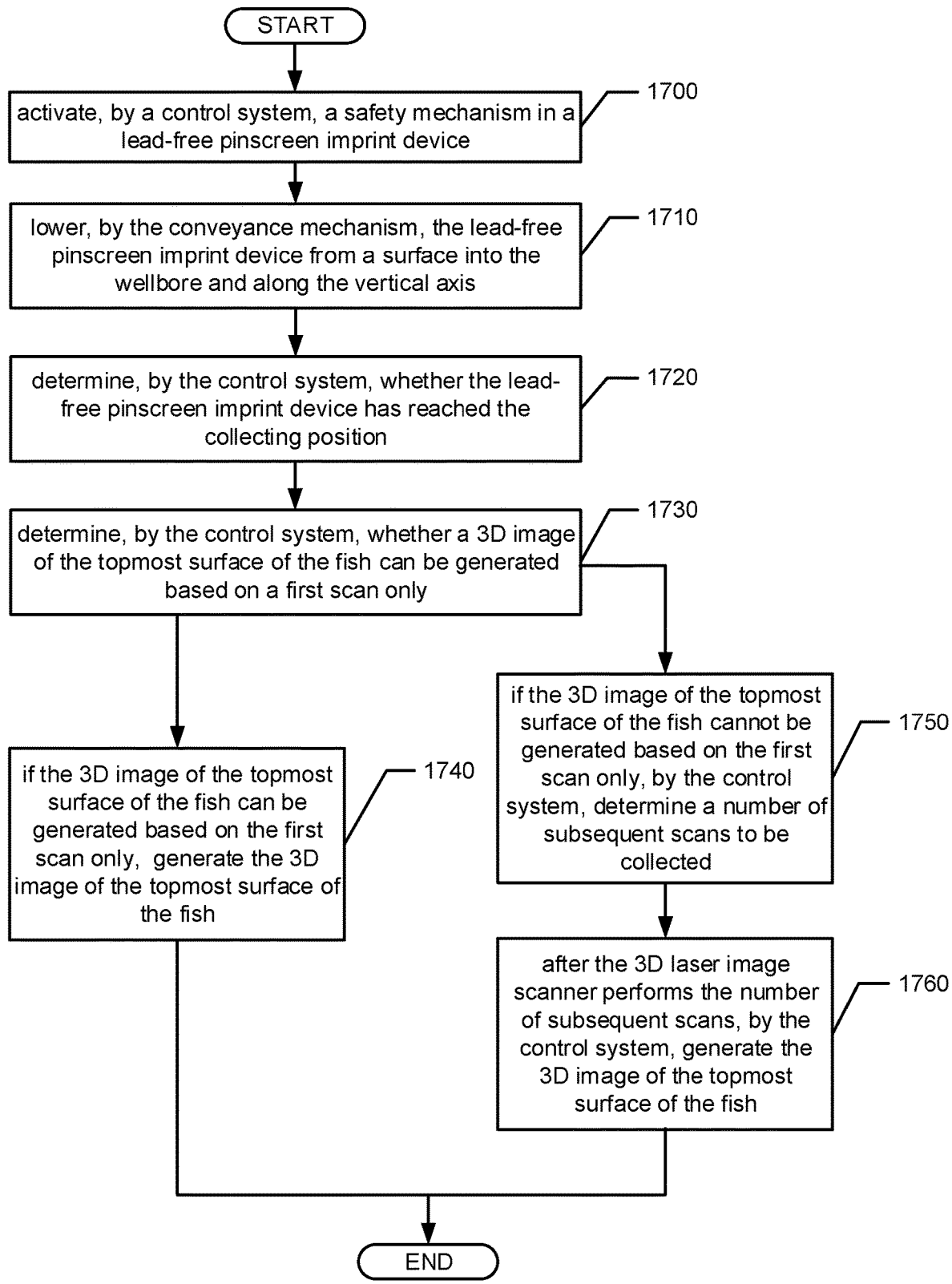
FIG. 17 shows a flowchart in accordance with one or more embodiments.

FIG. 17 shows a flowchart in accordance with one or more embodiments. Specifically, FIG. 17 describes a method for retrieving at least one imprint of the topmost surface 260 of the fish 265. In some embodiments, the method may be implemented using the devices described in reference to FIGS. 2-14. While the various blocks in FIG. 17 are presented and described sequentially, one of ordinary skill in the art will appreciate that some or all the blocks may be executed in different orders, may be combined, or omitted, and some or all the blocks may be executed in parallel. Furthermore, the blocks may be performed actively or passively.

In Block 1700, the control system 1040 activates the safety mechanism 1610 in the lead-free pinscreen imprint device 230. This activation prevents the plurality of pins to move vertically in response to coming in contact with loose debris in the wellbore.

In Block 1710, the lead-free pinscreen imprint device 230 is lowered into the wellbore using the conveyance mechanism 210. The lead-free pinscreen imprint device 230 is lowered along the vertical axis 240 from the rig floor 1045.

In Block 1720, the control system 1040 determines whether the lead-free pinscreen imprint device 230 has reached one of the collecting positions 1502 or 1602. As described above, the control system 1040 may be an automated server performing a sequence of non-linear actions or an operator that monitors the movement of the conveyance mechanism 210.

In Block 1730, the control system 1040 determines whether a 3D image of the topmost surface 260 of the fish 265 can be generated based on a single scan.

In Block 1740, in a case where the 3D image of the topmost surface 260 of the fish 265 can be generated using a single scan, the control system 1040 generates the 3D image of the topmost surface 260 of the fish 265.

In Block 1750, if the 3D image of the topmost surface 260 of the fish 265 cannot be generated based on one scan only, the control system 1040 (i.e., operator) determines a number of subsequent scans to be collected. In one or more embodiments, the number of scans required may be as many as necessary to obtain the best 3D image of the top fish.

In Block 1760, after the 3D laser image scanner performs the number of subsequent scans, the control system 1040 generates the 3D image of the topmost surface 260 of the fish 265.

While FIGS. 2-17 show various configurations of components, other configurations may be used without departing from the scope of the disclosure. For example, various components in FIGS. 2-14 may be combined to create a single component. As another example, the functionality performed by a single component may be performed by two or more components.

Figure 18:
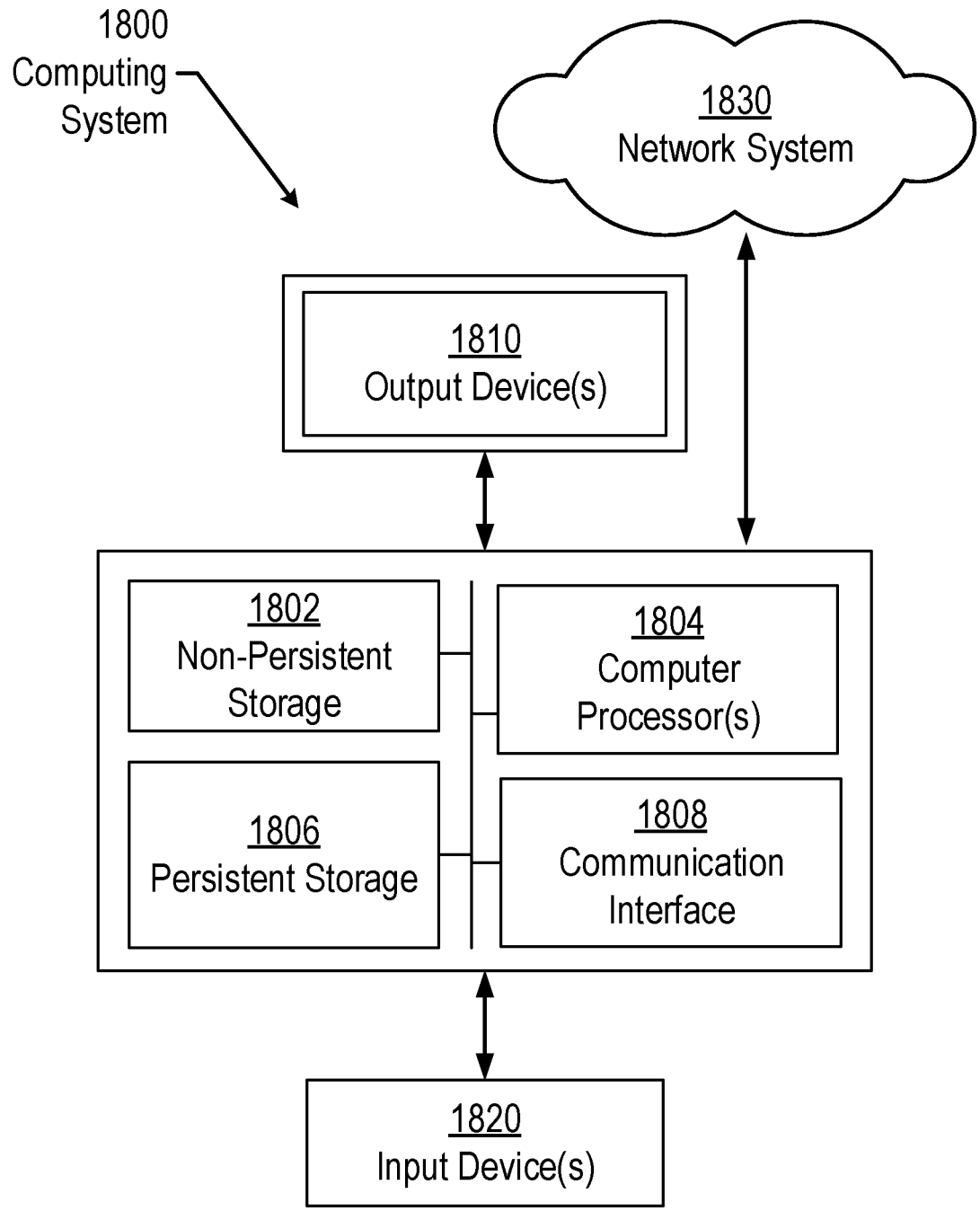
FIG. 18 shows an example of a computer system in accordance with one or more embodiments.

As shown in FIG. 18, the computing system 1800 may include one or more computer processor(s) 1804, non-persistent storage 1802 (e.g., random access memory (RAM), cache memory, or flash memory), one or more persistent storage 1806 (e.g., a hard disk), a communication interface 1808 (transmitters and/or receivers) and numerous other elements and functionalities. The computer processor(s) 1804 may be an integrated circuit for processing instructions. The computing system 1800 may also include one or more input device(s) 1820, such as a touchscreen, keyboard, mouse, microphone, touchpad, electronic pen, or any other type of input device. In some embodiments, the one or more input device(s) 1820 may be the control device 1040 described in reference to FIGS. 10-14 connected to the lead-free pinscreen imprint device 230 described in reference to FIG. 2. Further, the computing system 1800 may include one or more output device(s) 1810, such as a screen (e.g., a liquid crystal display (LCD), a plasma display, or touchscreen), a printer, external storage, or any other output device. One or more of the output device(s) may be the same or different from the input device(s). The computing system 1800 may be connected to a network system 1830 (e.g., a local area network (LAN), a wide area network (WAN) such as the Internet, mobile network, or any other type of network) via a network interface connection (not shown).

In one or more embodiments, for example, the input device 1820 may be coupled to a receiver and a transmitter used for exchanging communication with one or more peripherals connected to the network system 1830. The receiver may receive information relating to one or more reflected signals as described in reference to FIGS. 5-7. The transmitter may relay information received by the receiver to other elements in the computing system 1800. Further, the computer processor(s) 1804 may be configured for performing or aiding in implementing the processes described in reference to FIGS. 7, 8, and/or 9.

Further, one or more elements of the computing system 1800 may be located at a remote location and be connected to the other elements over the network system 1830. The network system 1830 may be a cloud-based interface performing processing at a remote location from the well site and connected to the other elements over a network. In this case, the computing system 1800 may be connected through a remote connection established using a 5G connection, such as protocols established in Release 15 and subsequent releases of the 3GPP/New Radio (NR) standards.

The computing system in FIG. 18 may implement and/or be connected to a data repository. For example, one type of data repository is a database. A database is a collection of information configured for ease of data retrieval, modification, re-organization, and deletion. In some embodiments, the databases include published/measured data relating to the method, the assemblies, and the devices as described in reference to FIGS. 2-7.

While FIGS. 2-18 show various configurations of components, other configurations may be used without departing from the scope of the disclosure. For example, various components in FIGS. 2-16 may be combined to create a single component. As another example, the functionality performed by a single component may be performed by two or more components.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A lead-free pinscreen imprint device for retrieving at least one imprint of a topmost surface of a fish located in a wellbore, the lead-free pinscreen imprint device comprising:
   a housing comprising a central aperture that extends along a section of a central axis thereof;
   a pinscreen portion disposed in the housing comprising:
      a plurality of pins that are disposed along a vertical axis that is parallel to the central axis, each pin of the plurality of pins comprising a top end and a bottom end and each pin being configured to be independently shifted along the vertical axis upon identifying a pressure at the bottom end,
      an imprint surface that faces in a downward direction, the imprint surface being a first plane formed by a plurality of bottom ends of the plurality of pins when the imprint surface is in a collecting position, and
      a scanning surface that faces in an upward direction, the scanning surface being a second plane parallel to the first plane and formed by a plurality of top ends of the plurality of pins when the scanning surface is in the collecting position; and
   a three-dimensional (3D) laser image scanner disposed in the housing at a location that is immediately above the pinscreen portion, the 3D laser image scanner being configured to scan the scanning surface and identify any depth changes in the scanning surface.

2. The lead-free pinscreen imprint device of claim 1, wherein the housing comprises an attachment configured to connect a conveyance mechanism that moves the lead-free pinscreen imprint device along the vertical axis, the conveyance mechanism being a wireline, a slickline, or via tubulars.

3. The lead-free pinscreen imprint device of claim 2, wherein the housing is a tubular body with the attachment configured to connect the conveyance mechanism at a first end and the plurality of pins at a second end, the attachment configured to connect the conveyance mechanism being a threaded box.

4. The lead-free pinscreen imprint device of claim 1, wherein the 3D laser image scanner includes a collection surface facing the scanning surface and forming a scanning chamber.

5. The lead-free pinscreen imprint device of claim 4, wherein each pin of the plurality of pins includes a sealing element that prevents fluids from entering the scanning chamber.

6. The lead-free pinscreen imprint device of claim 1, wherein the collecting position is a position when the lead-free pinscreen imprint device is located at a predetermined depth of the wellbore or when the lead-free pinscreen imprint device is located at a predetermined distance with respect to the topmost surface of the fish.

7. The lead-free pinscreen imprint device of claim 1, wherein the pinscreen portion is configured to prevent the plurality of pins from moving, each pin of the plurality of pins being free to slide upwards or downwards once the portion release the plurality of pins.

8. The lead-free pinscreen imprint device of claim 7, wherein upon deployment of the lead-free pinscreen imprint device into the wellbore, the pinscreen portion is configured to automatically release the plurality of pins upon identifying that the lead-free pinscreen imprint device is in the collecting position.

9. The lead-free pinscreen imprint device of claim 1, wherein the lead-free pinscreen imprint device is coupled to a processor that:
   controls a release of the plurality of pins;
   determines whether the lead-free pinscreen imprint device has reached the collecting position;
   after the 3D laser image scanner performs a first scan of the scanning surface, determines whether a 3D image of the topmost surface of the fish can be generated based on the first scan only;

if the 3D image of the topmost surface of the fish can be generated based on the first scan only, generates the 3D image of the topmost surface of the fish;

if the 3D image of the topmost surface of the fish cannot be generated based on the first scan only, determines a number of subsequent scans to be collected; and if the 3D image of the topmost surface of the fish cannot be generated based on the first scan only and after the 3D laser image scanner performs the number of subsequent scans, generates the 3D image of the topmost surface of the fish.

10. The lead-free pinscreen imprint device of claim 9, wherein cases where at least two impressions of the topmost surface of the fish are required and after retrieving a first imprint, the lead-free pinscreen imprint device is pulled up a couple of feet above the topmost surface of the fish and reset to take a second imprint.

11. A system for retrieving an imprint of a topmost surface of a fish located in a wellbore, the system comprising:
   a lead-free pinscreen imprint device, comprising:
      a housing comprising a central aperture that extends along a section of a central axis thereof,
      a pinscreen portion disposed in the housing comprising:
         a plurality of pins that are disposed along a vertical axis that is parallel to the central axis, each pin out of the plurality of pins comprising a top end and a bottom end and each pin out of the plurality of pins being configured to be independently shifted along the vertical axis upon identifying a pressure at the bottom end,
         an imprint surface that faces in a downward direction, the imprint surface being a first plane formed by a plurality of bottom ends of the plurality of pins when the imprint surface is in a collecting position, and
         a scanning surface that faces in an upward direction, the scanning surface being a second plane parallel to the first plane and formed by a plurality of top ends of the plurality of pins when the scanning surface is in the collecting position, and
      a three-dimensional (3D) laser image scanner disposed in the housing at a location that is immediately above the pinscreen portion, the 3D laser image scanner being configured to scan the scanning surface and identify any depth changes in the scanning surface;
   a conveyance mechanism configured to connect to an attachment of the housing, the conveyance mechanism being configured to move the lead-free pinscreen imprint device along the vertical axis; and
   a control system that:
      controls a release of the plurality of pins;
      determines whether the lead-free pinscreen imprint device has reached the collecting position;
      after the 3D laser image scanner performs a first scan of the scanning surface, determines whether a 3D image of the topmost surface of the fish can be generated based on the first scan only,
      if the 3D image of the topmost surface of the fish can be generated based on the first scan only, generates the 3D image of the topmost surface of the fish;
      if the 3D image of the topmost surface of the fish cannot be generated based on the first scan only, determines a number of subsequent scans to be collected; and
      if the 3D image of the topmost surface of the fish cannot be generated based on the first scan only and after the 3D laser image scanner performs the number of subsequent scans, generates the 3D image of the topmost surface of the fish.

12. The system of claim 11, wherein cases where at least two impressions of the topmost surface of the fish are required and after retrieving a first imprint, the lead-free pinscreen imprint device is pulled up a couple of feet above the topmost surface of the fish and reset to take a second imprint.

13. The system of claim 11, wherein the conveyance mechanism being a wireline, a slickline, or via tubulars.

14. The system of claim 11, wherein the housing is a tubular body with the attachment configured to connect the conveyance mechanism at a first end and the plurality of pins at a second end, the attachment configured to connect the conveyance mechanism being a threaded box.

15. The system of claim 11, wherein the 3D laser image scanner includes a collection surface facing the scanning surface and forming a scanning chamber.

16. The system of claim 15, wherein each pin out of the plurality of pins includes a sealing element that prevents fluids from entering the scanning chamber.

17. The system of claim 11, wherein the collecting position is a position when the lead-free pinscreen imprint device is located at a predetermined depth of the wellbore or when the lead-free pinscreen imprint device is located at a predetermined distance with respect to the topmost surface of the fish.

18. The system of claim 11, wherein the pinscreen portion is configured to prevent the plurality of pins from moving, each pin out of the plurality of pins being free to slide upwards or downwards once the pinscreen portion release the plurality of pins.

19. The system of claim 18, wherein upon deployment of the lead-free pinscreen imprint device into the wellbore, the pinscreen portion is configured to automatically release the plurality of pins upon identifying that the lead-free pinscreen imprint device is in the collecting position.

20. A method for retrieving at least one imprint of a topmost surface of a fish located in a wellbore, the method comprising:
   releasing, by a control system, a plurality of pins of a lead-free pinscreen imprint device, the lead-free pinscreen imprint device comprising:
      a housing comprising a central aperture that extends along a section of a central axis thereof, the housing comprising an attachment configured to connect a conveyance mechanism that moves the lead-free pinscreen imprint device along a vertical axis,
      a pinscreen portion disposed in the housing comprising:
         the plurality of pins that are disposed along the vertical axis that is parallel to the central axis, each pin out of the plurality of pins comprising a top end and a bottom end and each pin out of the plurality of pins being configured to be independently shifted along the vertical axis upon identifying a pressure at the bottom end,
         an imprint surface that faces in a downward direction, the imprint surface being a first plane formed by a plurality of bottom ends of the plurality of pins when the imprint surface is in a collecting position, and
         a scanning surface that faces in an upward direction, the scanning surface being a second plane parallel to the first plane and formed by a plurality of top ends of the plurality of pins when the scanning surface is in the collecting position,
a three-dimensional (3D) laser image scanner disposed in the housing at a location that is immediately above the pinscreen portion, the 3D laser image scanner being configured to scan the scanning surface and identify any depth changes in the scanning surface; and
the pinscreen portion is configured to prevent the plurality of pins from moving, each pin out of the plurality of pins being free to slide upwards or downwards once pinscreen portion release the plurality of pins;
lowering, by the conveyance mechanism, the lead-free pinscreen imprint device from a surface into the wellbore and along the vertical axis;
determining, by the control system, whether the lead-free pinscreen imprint device has reached the collecting position;
after the 3D laser image scanner performs a first scan of the scanning surface, determining, by the control system, whether a 3D image of the topmost surface of the fish can be generated based on the first scan only,
if the 3D image of the topmost surface of the fish can be generated based on the first scan only, by the control system, generating the 3D image of the topmost surface of the fish;
if the 3D image of the topmost surface of the fish cannot be generated based on the first scan only, by the control system, determining a number of subsequent scans to be collected; and
if the 3D image of the topmost surface of the fish cannot be generated based on the first scan only and after the 3D laser image scanner performs the number of subsequent scans, by the control system, generating the 3D image of the topmost surface of the fish.

* * * * *